US012756170B2

(12) United States Patent
Rohé

(10) Patent No.: US 12,756,170 B2
(45) Date of Patent: Oct. 6, 2026

(54) SUPPORTING DEVICE AND ROBOT ARM

(71) Applicant: KUKA Deutschland GmbH, Augsburg (DE)

(72) Inventor: Frank Rohé, Gersthofen (DE)

(73) Assignee: KUKA Deutschland GmbH (DE)

( * ) Notice: Subject to any disclaimer, the term of this patent is extended or adjusted under 35 U.S.C. 154(b) by 7 days.

(21) Appl. No.: 18/856,420

(22) PCT Filed: Apr. 14, 2022

(86) PCT No.: PCT/EP2022/060078
§ 371 (c)(1),
(2) Date: Oct. 11, 2024

(87) PCT Pub. No.: WO2023/198293
PCT Pub. Date: Oct. 19, 2023

(65) Prior Publication Data
US 2025/0266671 A1 Aug. 21, 2025

(51) Int. Cl.
*H02G 11/00* (2006.01)
*B25J 9/00* (2006.01)

(52) U.S. Cl.
CPC .......... *H02G 11/006* (2013.01); *B25J 9/0009* (2013.01)

(58) Field of Classification Search
CPC ............................ H02G 11/006; B25J 9/0009
See application file for complete search history.

(56) References Cited

U.S. PATENT DOCUMENTS 6,431,018 B1 * 8/2002 Okada .................. B25J 19/0025 74/490.02
7,810,765 B2 * 10/2010 Burlot .................. H02G 3/0481 248/75

(Continued)

FOREIGN PATENT DOCUMENTS

DE 102012020172 A1 4/2013
EP 3781371 B1 1/2022

OTHER PUBLICATIONS

European Patent Office; Search Report in related International Patent Application No. PCT/EP2022/060078 dated Dec. 12, 2022; 4 pages.

*Primary Examiner* — Eret C Mcnichols
(74) *Attorney, Agent, or Firm* — Dorton & Willis, LLP

(57) ABSTRACT

A supporting device for a cable routing device of a robot arm, wherein the cable routing device has a receiving space, in which a cable portion is mounted so as to be extendable in an extension direction, for supporting the cable routing device on the robot arm. The supporting device includes a first connection body designed to rigidly connect the first connection body to a cable routing device, a second connection body designed to rigidly connect the second connection body to a member of a robot arm, and a bearing arrangement designed to move the first connection body relative to the second connection body in a first rotational degree of freedom which is perpendicular to the extension direction. The bearing arrangement is guided in a rotationally movable manner and supported in a forcibly guided manner in a second rotational degree of freedom oriented perpendicular to both the extension direction and to the first rotational degree of freedom, depending on the movement of the first connection body about the first rotational degree of freedom.

20 Claims, 12 Drawing Sheets

(56) References Cited

U.S. PATENT DOCUMENTS

| | | | | |
|---|---|---|---|---|
| 9,138,902 | B2 * | 9/2015 | Suzuki | B25J 19/0025 |
| 10,059,011 | B2 * | 8/2018 | Burlot | B25J 19/0025 |
| 10,632,629 | B2 * | 4/2020 | Nasradini | B65H 79/00 |
| 11,040,457 | B2 * | 6/2021 | Carruthers | B25J 19/00 |
| 11,806,866 | B2 * | 11/2023 | Mizoguchi | B25J 19/0025 |
| 2021/0308879 | A1 * | 10/2021 | Mizoguchi | B25J 19/0025 |

* cited by examiner

SUPPORTING DEVICE AND ROBOT ARM

CROSS-REFERENCE TO RELATED APPLICATIONS

This application is a national phase application under 35 U.S.C. § 371 of International Patent Application No. PCT/EP2022/060078, filed Apr. 14, 2022 (pending), the disclosure of which is incorporated by reference herein in its entirety.

TECHNICAL FIELD

The invention relates to a supporting device for a line routing device of a robot arm, wherein the line routing device comprises a receiving space in which a line portion is supported so as to be extendable in an extension direction, for supporting the line routing device on the robot arm. The invention also relates to a robot arm with a line routing device and such a supporting device.

BACKGROUND

DE 10 2012 020 172 A1 describes a fastening device for a line routing device, which comprises a receiving space in which a line portion is supported so as to be extendable in an extension direction, for supporting the line routing device on a robot arm comprising several links and joints that adjust the links relative to one another, comprising a first connection body which is designed to rigidly connect the first connection body of the fastening device to a line routing device, a second connection body which is designed to rigidly connect the second connection body of the fastening device to a link of a robot arm, and a joint which is designed to movably support the second connection body relative to the first connection body in two different rotational degrees of freedom, each oriented perpendicular to the extension direction.

SUMMARY

The object of the invention is to provide a supporting device for a line routing device of a robot arm, which enables an improved, in particular wear-reducing, extension and retraction of an energy supply line from a receiving space of the line routing device during operation on a robot arm when the line routing device is attached to a link of the robot arm by means of the supporting device.

The object is achieved by a supporting device for a line routing device of a robot arm, wherein the line routing device comprises a receiving space in which a line portion is mounted so as to be extendable in an extension direction, for supporting the line routing device on the robot arm, said supporting device comprising:

a first connection body which is designed to rigidly connect the first connection body of the supporting device to a line routing device a second connection body which is designed to rigidly connect the second connection body of the supporting device to a link of a robot arm, an a bearing arrangement which is designed to guide the first connection body relative to the second connection body in a first rotational degree of freedom which is oriented perpendicular to the extension direction, to guide it rotatably, and to support it in a forcibly guided manner in a second rotational degree of freedom which is oriented both perpendicular to the extension direction and perpendicular to the first rotational degree of freedom, depending on the movement of the first connection body about the first rotational degree of freedom.

The supporting device is used to attach or support a complete line routing device to a link of a robot arm. For example, in the case of an industrial robot in the design of a kick arm robot with six degrees of freedom, i.e., with a total of six joints, the line routing device can be attached or supported on a base arm of an arm extension of the robot arm. The robot arm can comprise, for example, a base frame as a first link, on which a carousel, as a following second link, is mounted so as to be rotatable about a vertical axis, and is rotationally driven by means of a first drive motor. On the carousel, a rocker is mounted as a third link so as to be pivotable up and down about a second horizontal axis, and is rotationally driven by means of a second drive motor. The rocker carries as a fourth link a base arm of the arm extension, which is mounted so as to be pivotable up and down about a third horizontal axis and is rotationally driven by means of a third drive motor. A fourth axis is provided on the arm extension and runs in the longitudinal extension of the arm extension and drives a front arm as a fifth link via a fourth drive motor. A robot hand is mounted pivotably on the front arm and can pivot about a fifth axis so that it can be moved by means of a fifth drive motor. In addition, the robot hand comprises a sixth axis in order to be able to rotatably drive a fastening flange, which forms a last, seventh link of the robot arm, by means of a sixth drive motor.

The line routing device serves to enable length compensation so that a supply line can be guided as close as possible to the contours of the links and joints of the robot arm during movement of the robot arm. For this purpose, the line routing device generally comprises a receiving space in which a line portion of the supply line is stored, such that the line portion stored in the receiving space of the line routing device is pulled out or pulled in again depending on the movement of the robot arm and thus depending on the movement of a free end portion of the supply line, which is attached in particular to a flange of the robot arm. For this purpose, the supply line can be spring-loaded and mounted in the receiving space of the line routing device.

A supply line is understood to mean in particular an energy line and/or an energy supply, which can comprise lines such as electrical lines, cold and/or hot water lines, fluid and/or pressure lines to tools that are flange-mounted to the robot arm. The supply line, in particular the energy line and/or the energy supply, can be combined in individual strands or in cable bundles and in particular can be sheathed with one or more flexible protective hoses, such as corrugated hoses.

Due to the extensive freedom of movement of the flange of the robot arm during movement of the robot arm and due to the potentially high dynamics of the movement, the extendable line portion is exposed to high mechanical loads. In particular in the region where the line portion exits the receiving space of the line routing device, the line portion is sometimes dragged along edges of the exit opening of the line routing device, sometimes even at high bending angles if the line routing device and in particular its receiving space is rigidly attached to the robot arm.

With the supporting device according to the present disclosure, the complete line routing device can follow the extension movement of the line portion to a certain extent, so that high bending angles are avoided. Due to the supporting device according to the disclosure, the line routing device and thus also the receiving space can automatically follow the movement of the line portion, since the line routing device automatically orients itself in the pulling direction due to the tensile force on the line portion and thereby reduces the bending angle. Since the bearing arrangement is designed to guide the first connection body relative to the second connection body in a first rotational degree of freedom which is oriented perpendicular to the extension direction, to guide it rotatably, and to support it in a forcibly guided manner in a second rotational degree of freedom which is oriented both perpendicular to the extension direction and perpendicular to the first rotational degree of freedom, depending on the movement of the first connection body about the first rotational degree of freedom, the line routing device can follow the extended line portion particularly well. This further reduces the bending angle of the line portion in the exit area of the line routing device and can thus help even better to reduce wear on the supply line and increase the service life of the entire line routing device.

In addition, only a shorter extension length is required if the orientation of the line routing device can follow the current extension direction of the line portion. Starting from the pivot point of the line routing device, which can be located, for example, in the area of a spherical bearing of the supporting device, the line portion no longer needs to follow a bend in the area of the outlet opening of the receiving space, but can be guided on a straight line, so that the required extension length is smaller when the line routing device is rotated in the current extension direction. This also relieves the load on the spring device, which is required to bring the extended line portion back into the receiving space. In this respect, the overall restoring force in the spring device may be reduced.

The bearing arrangement has the function initially of holding the complete line routing device on a selected link of the robot arm so that the line routing device is carried by that link. The line routing device, when mounted on the robot arm, therefore follows the movement of that link of the robot arm to which the line routing device is attached by means of the bearing arrangement. In addition, the bearing arrangement has the function of enabling the line routing device to be movable relative to the link of the robot arm to which the line routing device is attached by means of the bearing arrangement. The first rotational degree of freedom here is a free rotational degree of freedom, so that the line routing device, due to external forces acting on the line routing device, in particular on the receiving space, allows a relative movement of the line routing device with respect to that link of the robot arm to which the line routing device is attached by means of the bearing arrangement. At the same time, the bearing arrangement comprises a second degree of rotational freedom, which depends on the movement of the line routing device about the first rotational degree of freedom, but is forcibly guided. This means that the line routing device cannot rotate freely about the second rotational degree of freedom, but the rotation of the line routing device about the second rotational degree of freedom is directly dependent on the rotational position of the line routing device about the first rotational degree of freedom.

Since the line routing device, when it is attached to a link of the robot arm by means of the supporting device according to the invention, follows a movement of the robot arm in space, it is expedient to define the first rotational degree of freedom, the second rotational degree of freedom and the third rotational degree of freedom relative to the line routing device or in particular relative to the extension direction of the line portion of the line routing device. Accordingly, a corresponding coordinate system can comprise its origin at the supporting device according to the invention. Preferably, the origin of the coordinate system can then be fixed with respect to the first connection body of the supporting device. Alternatively, another coordinate system can be defined of which the origin can be fixed relative to the second connection body of the supporting device. Then, the coordinate system would also be fixed with respect to a link of the robot arm to which the supporting device is attached.

The Cartesian coordinate system comprises three orthogonally oriented axes, which correspond to the three rotational axes of the rotational degrees of freedom, wherein one axis is oriented in the extension direction of the line portion. The extension direction is determined by the pulling direction in which the line portion in the area of the outlet opening of the line routing device is pulled out of the receiving space of the line routing device due to its design.

The first rotational degree of freedom is therefore oriented perpendicular to the extension direction. Using the example of a line routing device attached to a base arm of a robot arm, in a basic position of the robot arm (e.g. adjustment position with axis position of −90 degrees at the second joint and +90 degrees at the third joint of the robot arm), in which the base arm of the robot arm is oriented exactly horizontally, the first rotational degree of freedom in the Cartesian coordinate system can be referred to as the vertically oriented Z-axis. This Z-axis is therefore oriented in the direction of gravity. It can also be referred to as the yaw axis. The second rotational degree of freedom can therefore be formed so as to be oriented perpendicular both to the first rotational degree of freedom (Z-axis, yaw axis) and perpendicular to the extension direction, which in the Cartesian coordinate system can be referred to as a horizontally oriented Y-axis. This Y-axis can also be referred to as the pitch axis. The remaining third rotational degree of freedom is therefore oriented in the direction of the extension direction, i.e., the third rotational degree of freedom extends in the extension direction. This third rotational degree of freedom in the Cartesian coordinate system can be referred to as a horizontally oriented X-axis. This X-axis can also be referred to as the roll axis.

In such a typical configuration, a free, rotationally movable guide of the first rotational degree of freedom means that the line routing device can swing out freely laterally about the Z-axis, i.e., the yaw axis, depending on where the extendable line portion is guided to by the hand flange when the robot arm moves. Due to the forced guidance of the second rotational degree of freedom, depending on the pivot position of the line routing device about the Z-axis, a fixedly assigned tilting movement or pitching movement of the line routing device is established about the Y-axis, i.e., about the pitch axis. In this case, a change in the rolling inclination about the X-axis would have no significant functional effect on the extension of the line portion from the receiving space, since the X-axis runs exactly in the extension direction and would therefore at most cause a torsion of the line portion. On the other hand, a forcibly guided adjustment about the X-axis can be useful in other cases, for example when undesirable torsions in the line portion are to be compensated. In such a case, the third rotational degree of freedom can also be exchanged with the second rotational degree of freedom. In a first variant, either only the second rotational degree of freedom or only the third rotational degree of freedom can be forcibly guided depending on the first rotational degree of freedom. In a second variant, both the second rotational degree of freedom and the third rotational degree of freedom can be forcibly guided simultaneously, depending on the first rotational degree of freedom.

The first connection body defines in an assembly of line routing device, supporting device according to the invention and robot arm, the unique position and the respective location of the line routing device.

The second connection body defines in an assembly of line routing device, supporting device according to the invention and robot arm, the unique position and the respective location of the line routing device together with the supporting device with respect to the link of the robot arm to which the line routing device is attached.

The bearing arrangement can generally be designed to firmly support the second connection body relative to the first connection body in all three degrees of freedom of thrust. The three degrees of freedom of thrust generally mean translational mobility in the X-direction, Y-direction and Z-direction in the case of a Cartesian coordinate system. Mobility in the X-direction, Y-direction and Z-direction would therefore be prevented here, i.e., not possible.

A fixed supporting of the second connection body relative to the first connection body in all three degrees of freedom of thrust means that the line routing device cannot be linearly displaced with respect to the link of the robot arm on which the line routing device is to be mounted due to the line portion being pulled out or pulled in. The fixed supporting of the second connection body relative to the first connection body in all three degrees of freedom of thrust means in the Cartesian coordinate system that the line routing device, when mounted on a link of the robot arm by means of the supporting device, cannot be moved linearly in the X-direction, Y-direction or Z-direction. The line routing device can therefore only perform rotations of a maximum of three rotational degrees of freedom.

The bearing arrangement can also generally be designed to support the first connection body in a forcibly guided manner relative to the second connection body in a third rotational degree of freedom rotating about the extension direction depending on the movement of the first connection body about the first rotational degree of freedom. This corresponds to the variant already described, in which both the second rotational degree of freedom and the third rotational degree of freedom are both forcibly guided simultaneously, depending on the first rotational degree of freedom.

In a first basic embodiment, the bearing arrangement can be designed as a forcibly guided spherical rotary guide. By means of a forcibly guided spherical rotary guide, in particular an independent constructive determination of the forced guidance by a second rotational degree of freedom and the forced guidance by a third rotational degree of freedom, in each case depending on the first rotational degree of freedom.

The forcibly guided spherical rotary guide can comprise a form-fitting forced running safeguard which, on the one hand, scans a guide track in order to achieve a forcibly guided corresponding rotational position of the first connection body about the second and/or third rotational degree of freedom depending on the current rotational position of the first connection body about the first rotational degree of freedom. On the other hand, this form-fitting forced running safeguard can also serve to achieve a freedom from play, so that a high running quality or a jerk-free and/or shock-free movement of the first connection body and thus of the line routing device is ensured.

The forcibly guided spherical rotary guide can ensure collision-free guidance of the line routing device when the robot arm on which the line routing device is mounted by means of the supporting device moves. The forcibly guided spherical rotary guide can therefore perform a pivoting movement and/or a tilting movement, more specifically always depending on the current rotational position about the first rotational degree of freedom. Accordingly, the line routing device can perform a superimposed yaw, pitch and/or roll movement. The design can ensure that there is no contact or collision between the line routing device and the robot arm. The type of movement imposed on the line routing device can also prevent a collision with other objects that are located, for example, in a work area in which the robot arm is moving.

The bearing arrangement according to the invention can in particular be assembled from commercially available machine elements, preferably even standard parts, which enables cost-effective production and can ensure safe operation. Spherical rotary guides can, for example, be manufactured with dry lubrication, e.g. from PTFE materials or coated correspondingly with PTFE materials. This means that the spherical rotary guides can operate in particular maintenance-free. The bearing arrangement can be manufactured in different sizes, in particular to adapt to the sizes of the robot arms, and can in particular comprise modularly classified sizes.

The main joint can comprise a centrally located ball joint with a joint degree of freedom f=3. Further partial joints, for example cylindrical rollers, with a respective joint degree of freedom f=4 can be arranged around this ball joint, offset by 90 degree to each other. These partial joints can scan a spatially curved guide curve, i.e., the guide track. The guide curve or guide track is designed so that the line routing device can move around the robot arm without collision. By simultaneously scanning a complementary curve, the forced running, particularly free of play, can be achieved. For example, the axes of rollers can intersect in the center of the ball joint. In addition, the axes of the rollers can be oriented with each other in pairs. Since all axes of rotation intersect at one point and the trajectories of limb points lie on concentric spherical shells, this is a spherical arrangement.

The technical principle is comparable to the processing of a cam gear, analogous to a tappet drive. A ram or a scanner scans a spatially curved curve by means of frictional engagement or form fit. The scanner can also be called a guide track follower.

The forced running safeguard can generally be achieved by frictional engagement, for example spring force, or by form fit, as for example with a grooved curve, or by simultaneous scanning of a complementary curve. In the case of a forced running safeguard, freedom from play can be achieved by simultaneously scanning a complementary curve. This arrangement has a high running quality, it is shock-free and enables jerk-free movement.

A first pair of partial joints provides the forced running and the other pair of partial joints provides the forced running safeguard.

The bearing arrangement, in particular the forcibly guided spherical rotary guide, can comprise a wobble turntable which is mounted on a frame by means of a centrally arranged spherical rotary bearing with three rotational degrees of freedom and is forcibly guided on the circumference on a circumferential guide connected to the frame.

The wobble turntable can have different forms. The essential feature of the wobble turntable is its rigid form in conjunction with the centrally arranged spherical pivot bearing and a circumferential guide arranged at a distance from the central spherical pivot bearing Since the centrally arranged spherical pivot bearing has three rotational degrees of freedom and the wobble turntable is only supposed to be freely rotatable in one rotational degree of freedom, the other two rotational degrees of freedom must be forcibly guided, which is achieved by the circumferential guide. The circumferential guide can initially be designed differently and, for example, comprise at least one lever on the wobble turntable, which is, for example, forcibly guided in an annular groove or partial annular groove guided over a circumference or partial circumference around the spherical pivot bearing.

The centrally arranged spherical pivot bearing rests against a frame. The frame forms an abutment for the wobble turntable and is connected to the second connection body. The frame supports the wobble turntable relative to a link of the robot arm when the supporting device is attached to this link of the robot arm by means of the bearing arrangement. Then the frame that supports the wobble turntable is rigidly connected to this link of the robot arm.

The wobble turntable can, for example, have a cross-shaped form, as will be explained in greater detail later for a specific exemplary embodiment. The wobble turntable can accordingly comprise, for example, four arms which are arranged offset by 90 degrees from one another and which can extend outwards at least substantially radially from the centrally arranged spherical pivot bearing. The forcibly guided bearing can be arranged at a respective free end of each arm.

The circumferential guide may comprise a guide track connected to the frame, on which at least one guide track follower moves, which is connected to the wobble turntable.

In the case of a single guide track follower, this can comprise a roller which engages in a circumferential groove. An upper wall of the groove can form an upper guide track which touches the roller on its upper side and a lower wall of the groove can form a lower guide track which touches the roller on its lower side or the roller rolls on the lower guide track and cannot move upwards because the upper wall of the groove prevents the roller from moving upwards.

Alternatively, the corresponding forced guidance can also be achieved by comprising the wobble turntable with two opposing arms extending away from each other, each of which is equipped with a roller. Each of the two rollers runs on its own guide track. The first roller runs on a first guide track of a first contour, which determines the movement of the wobble turntable about the forced (second) rotational degree of freedom. The opposite second roller runs on a second guide track of a second contour, which is mirrored point-symmetrically to the first contour of the first guide track. By supporting the second roller on the second guide track, the first roller is prevented from lifting off the first guide track. In this way, forced guidance is ensured, for example, about the second rotational degree of freedom.

If forced guidance is to be ensured also for the third degree of rotational freedom, this can be achieved by comprising the wobble turntable with two additional arms extending away from each other, each of which is equipped with an additional roller. Each of the two rollers runs on its own guide track. The third roller runs on a third guide track of a third contour, which determines the movement of the wobble turntable about the forced (third) rotational degree of freedom. The fourth roller opposite the third roller runs on a fourth guide track of a fourth contour, which is mirrored point-symmetrically to the third contour of the third guide track. By supporting the fourth roller on the fourth guide track, the third roller is prevented from lifting off the third guide track. If a changing forced guidance, i.e., a forcibly guided movement about the third rotational degree of freedom, is not required, both the third guide track and the fourth guide track can be flat and extend in the same plane.

The at least one guide track follower can thus comprise a roller which is rotatably mounted on the wobble turntable and which rolls on the guide track.

Each guide track follower can therefore comprise one roller. The respective roller is preferably designed without a drive. The roller can also be designated as a support roller. It can comprise a roller carrier, for example with two opposing tabs on which a plug-in axle is mounted on both sides, onto which the roller is attached and rotatably mounted. A rolling bearing can be inserted between the plug-in axle and the roller. Alternatively, the roller can be mounted on a plain bearing. The running surface of the roller forms a rolling pair with the respective guide track.

The wobble turntable can comprise a first guide track follower that moves on a first track portion of the guide track, and the wobble turntable can comprise a second guide track follower that is arranged opposite the first guide track follower and moves on a second track portion of the guide track, wherein the path of the first track portion is complementary to the path of the second track portion, such that the wobble turntable rotates without play about the second rotational degree of freedom when the wobble turntable rotates about the first rotational degree of freedom.

In a special design variant with only a first guide track follower and a second guide track follower, the wobble turntable can be designed not to allow rotation about the third rotational degree of freedom, i.e., to structurally prevent or block it. For this purpose, the wobble turntable can comprise a third guide track follower which moves on a third track portion of the guide track and a fourth guide track follower arranged opposite the third guide track follower which moves on a fourth track portion of the guide track. However, in this special design variant, the third track portion and the fourth track portion are designed as flat tracks, which preferably both lie in the same spatial plane and this spatial plane is oriented, for example, parallel to the extension direction (X-axis) and parallel to the pitch axis (Y-axis). In other words, the flat tracks of the third track portion and the fourth track portion extend at least substantially perpendicular to the yaw axis (Z-axis). In this limited mobility of the wobble turntable, the line routing device can therefore only rotate about the yaw axis (Z-axis) and, depending on this, can only rotate about the pitch axis (Y-axis). The line routing device therefore remains constant with respect to a rolling movement, i.e., a rotation about the extension direction (X-axis).

Accordingly, alternatively or additionally, the wobble turntable can comprise a third guide track follower that moves on a third track portion of the guide track, and the wobble turntable can comprise a fourth guide track follower arranged opposite the third guide track follower that moves on a fourth track portion of the guide track, wherein the path of the third track portion is complementary to the path of the fourth track portion, such that the wobble turntable rotates without play about the third rotational degree of freedom when the wobble turntable rotates about the first rotational degree of freedom.

However, in a modification to a locked rolling movement, i.e., a rotation about the extension direction (X-axis), as described above, in another embodiment the third track portion and the fourth track portion can comprise a course that deviates from the flat course, in particular a curved course. Such a curved course of the third track portion and the fourth track portion then results in the wobble turntable and thus also the line routing device being able to perform a forced rotation about the extension direction (X-axis) when the wobble turntable rotates about the first rotational degree of freedom.

In a first variant, the wobble turntable can comprise a total of three guide track followers, each of which moves on a track portion of a total of three track portions of the guide track. The three guide track followers can then be arranged oriented with their axes of rotation offset by 120 degrees from each other.

In a second variant, the wobble turntable can comprise a total of four guide track followers, each of which moves on a track portion of a total of four track portions of the guide track. The four guide track followers can then be arranged oriented with their axes of rotation offset by 90 degrees from each other.

In a third variant, the wobble turntable can comprise a total of five guide track followers, each of which moves on a track portion of a total of five track portions of the guide track. The five guide track followers can then be arranged oriented with their axes of rotation offset by 72 degrees from each other.

The movement or guide tracks do not have to be point-symmetrical to each other. The respective radius or the distance between the partial joints, i.e., the guide track followers, the track portions or the rollers and the central main joint (ball joint) does not have to be the same. Although equal radii or equal distances simplify design and production, this is not mandatory. The guide tracks, however, must be coordinated with each other. Also important is the fundamentally spherical arrangement, so that all axes intersect at the center of rotation.

The guide track can comprise at least one locking stop which is designed to limit a rotational movement of the wobble turntable about the first rotational degree of freedom to a rotation angle of less than 90 degrees.

The at least one locking stop can be formed by a concave recess in the respective guide track on which the respective roller rolls. The concave recess can be adapted to the diameter of the roller. Alternatively, the locking stop can be formed by a projection or recess in the respective guide track, which prevents further rolling of the roller on the guide track by the roller striking the projection or plunging into the recess.

In all design variants, the guide track can be attached to the frame in an interchangeable manner using removable fastening means.

Due to such a detachable fastening of the guide track or the guide track portions, a first guide track contoured in a first form can be replaced by a different second guide track which has a second form that is different from the first form. In this way, the forcibly guided movement behavior of the wobble turntable and consequently the forcibly guided movement behavior of the line routing device can be changed as required. Such a need-based change in the movement behavior may be necessary, for example, if the robot program is changed and thus the robot arm performs a different movement, the tool supplied by the line routing device, which is handled by the robot arm, is changed, or the robot arm is intended to work in a changed work environment.

The detachable fastening means can in particular be fastening means that can be loosened or tightened by a fitter using hand tools. For example, the removable fastening means can be screws or studs in combination with nuts.

In a second basic embodiment, the bearing arrangement can be designed as a spatial coupling gear. By means of a spatial coupling gear, a common constructive determination of the forced guidance can be achieved by a second rotational degree of freedom and the forced guidance by a third rotational degree of freedom, in each case depending on the first rotational degree of freedom.

The second basic embodiment of a supporting device or a bearing arrangement may comprise a tilting frame. In this respect, the tilting frame corresponds functionally to the wobble turntable according to the first basic embodiment of a supporting device or a bearing arrangement. The tilting frame can either be made of rigid struts or can be designed as a solid body. In the case of a solid body, the tilting frame can also be a plate or a flat sheet of metal. The tilting frame is mounted on the frame of the supporting device via the spatial coupling gear.

The bearing arrangement, in particular the spatial coupling gear, can comprise a tilting frame which is mounted on a frame at a first end portion of the tilting frame by means of a spherical pivot bearing with three rotational degrees of freedom and is mounted on the frame at a second end portion of the tilting frame opposite the first end portion of the tilting frame by means of a four-bar linkage.

The spherical pivot bearing can also be referred to as a ball joint. The spherical pivot bearing, i.e., the ball joint, is distinguished in that it allows rotations in all three rotational degrees of freedom (Cartesian coordinate system), but blocks all three degrees of freedom of thrust (linear X-direction, linear Y-direction and linear Z-direction). The spherical pivot bearing can be arranged on the tilting frame in such a position that, when the line routing device is fastened to the tilting frame, it is positioned at least substantially below a rear end of the receiving space for the line portion of the line routing device with respect to the extension direction.

The four-bar linkage can span a joint plane which is oriented at least substantially perpendicular to the extension direction of the line portion of the line routing device from the receiving space when the line routing device is fastened to the tilting frame. The joint plane of the four-bar linkage is preferably located at a middle height of the longitudinal extension of the receiving space of the line routing device. The longitudinal extension of the receiving space corresponds to the extension direction of the line portion.

The four-bar linkage comprises a total of four spherical rotating joints. A first spherical rotating joint connects a first coupling link to the tilting frame. A second spherical rotating joint connects the first coupling link to the frame. A third spherical rotating joint connects the tilting frame to a second coupling link. A fourth spherical rotating joint connects the second coupling link to the frame. The second spherical rotating joint and the fourth spherical rotating joint are spaced apart from each other. Likewise, the first spherical rotating joint and the third spherical rotating joint are arranged at a distance from each other. The distance of the second spherical rotating joint from the fourth spherical rotating joint can in particular be smaller than the distance of the first spherical rotating joint from the third spherical rotating joint.

The four-bar linkage can comprise a first coupling rod, at the distal first rod end of which a first spherical rotating joint is arranged which couples the first coupling rod to the tilting frame, and at the proximal second rod end of which a second spherical rotating joint is arranged which couples the first coupling rod to the frame, and the four-bar linkage can comprise a second coupling rod, at the distal third rod end of which a third spherical rotating joint is arranged which couples the second coupling rod to the tilting frame, and at the proximal fourth rod end of which a fourth spherical rotating joint is arranged which couples the second coupling rod to the frame.

The four-bar linkage can be specially designed as a symmetrical double rocker. However, depending on the desired movement behavior for the line routing device, the four-bar linkage can also be designed as another subtype of four-bar linkage. The four-bar linkage can therefore be designed to be rotatable or even penetrating, instead of non-rotatable. Thus, the four-bar linkage could be designed as a modification to the versions of symmetrical double rockers explained in greater detail in the exemplary embodiments, alternatively as a crank rocker, centric crank rocker, double crank, parallel crank mechanism, counter-rotating twin crank mechanism, isosceles crank rocker or isosceles double crank, if this is sensible and technically feasible for the respective application. The same applies to the absolute dimensions of the lengths of coupling rods and the distances between the bearing points.

In this embodiment, the first coupling link is formed by a first coupling rod and the second coupling link is formed by a second coupling rod. Proximal means that the rod end in question is facing the frame, i.e., is closer to the robot arm. Distal means that the rod end in question is facing the tilting frame, i.e., is further away from the robot arm, i.e., is closer to the line routing device. Both the first coupling rod and the second coupling rod are rigid. In particular, the first coupling rod and the second coupling rod have the same effective lengths.

The first spherical rotating joint and the second spherical rotating joint of the first coupling rod, as well as the third spherical rotating joint and the fourth spherical rotating joint of the second coupling rod can be designed as joint heads. The joint heads can be designed in particular according to DIN ISO 12240-4. The first spherical rotating joint and the second spherical rotating joint of the first coupling rod, as well as the third spherical rotating joint and the fourth spherical rotating joint of the second coupling rod form ball joints.

The second spherical rotating joint of the first coupling rod and the fourth spherical rotating joint of the second coupling rod can be positioned on the frame at a smaller distance from each other than the first spherical rotating joint of the first coupling rod and the third spherical rotating joint of the second coupling rod are arranged at a distance from each other on the tilting frame.

In the sense of a four-bar linkage, one coupling rod can be considered as the driving crank and the other coupling rod can be considered as the driven rocker. The tilting frame forms the coupling which connects one coupling rod to the other coupling rod in an articulated manner. The angle between the coupling rod and the coupling, i.e., the tilting frame, should preferably be at least 40 degrees. This angle is also referred to as the transmission angle. The motion quality depends on the minimum transmission angle. This angle is the acute angle between the absolute path tangent and the relative path tangent at the force transmission point between the transmission element, i.e., the coupling rod, and the output element, which is assumed to be formed by the tilting frame. Traditionally, a rocker or a crank is used as the drive link and the rocker as the output link. In this case, the permissible transmission angle should be greater than 40 degrees to avoid blockages, jamming or locking positions. This principle is equally applicable to the present bearing arrangement, although none of the coupling rods is actively driven. In the present bearing arrangement, neither the crank nor the rocker form a drive. For the present bearing arrangement, the line routing device is firmly mounted on the coupling, i.e., on the tilting frame, i.e., the coupling element is driven by the inherent movement of the hose package.

The four-bar linkage is therefore not capable of rotating, which is neither necessary nor desired.

The four-bar linkage supports the tilting frame in a central area, so that the line routing device is also mounted approximately in the middle by the four-bar linkage. The spherical pivot bearing, on the other hand, is located in the area of a rear end of the tilting frame or the line routing device, i.e., where the energy line harness of the line routing device is led into the receiving space of the line routing device.

The spherical pivot bearing can be arranged at a distance from an outlet opening of the receiving space that is two to three times greater than the distance of the four-bar linkage from the spherical pivot bearing. This achieves a balanced ratio of the bearing reactions in the spherical pivot bearing on the one hand and in the four-bar linkage on the other. The closer the spherical pivot bearing and the four-bar linkage are to each other and the further the outlet opening is from the four-bar linkage, the greater the bearing forces become. However, if the four-bar linkage is positioned very far away from the spherical pivot bearing and at the same time the four-bar linkage is brought very close to the outlet opening, the mobility of the line routing device is reduced. If the spherical pivot bearing is arranged at a distance from the outlet opening of the receiving space that is in a range that is two to three times greater than the distance of the four-bar linkage from the spherical pivot bearing, a balanced ratio of mobility to bearing loads is achieved.

The supporting device comprises a frame, which in the simplest embodiment can be formed by a flat sheet of metal. This frame can be connected to the second connection body or can directly form the second connection body. Both the spherical pivot bearing and the four-bar linkage are arranged on the top side of the frame. The tilting frame is mounted in a rotationally movable and forcibly guided manner with respect to the frame by means of the spherical pivot bearing and the four-bar linkage, as described. The tilting frame carries the line routing device. The tilting frame can be connected to the first connection body or can directly form the first connection body.

In a basic position of the tilting frame, its main extension plane is oriented parallel to the main extension plane of the frame. This also corresponds to a basic position of the line routing device when it is attached to the tilting frame. In a basic position of the robot arm, for example, one arm extension of the robot arm is oriented horizontally. If the supporting device and thus also the line routing device are attached to the arm extension of the robot arm, the tilting frame also extends in a horizontal plane in its basic position. Accordingly, the line routing device then also extends in a horizontal plane. This means that in the basic position the extension direction of the line routing device is also horizontal.

If the line portion is now pulled out of the receiving space at an angle to the extension direction of the line routing device by a pulling movement triggered by a movement of the robot hand in space, which guides the front end of the line, lateral forces act on the casing of the line routing device so that it can rotate sideways due to the free first rotational degree of freedom of the supporting device, which, due to the forcibly guided second rotational degree of freedom and/or third rotational degree of freedom, immediately causes the tilting frame and thus also the line routing device to tilt downwards and/or rotate axially. This then corresponds to a pitching or rolling of the line routing device, which is superimposed on the pivoting movement of the line routing device.

The four-bar linkage may comprise a spring device designed to hold the tilting frame in a central basic position with respect to the frame when no external forces act on the supporting device.

If the line portion is pulled back into the receiving space against the extension direction of the line routing device by a relieving movement of the robot hand in the space which guides the front end of the line, no lateral forces act on the casing of the line routing device or at least only smaller lateral forces act on the casing of the line routing device. In this case, it may be desirable for the line routing device to automatically return to its initial position, i.e., its basic position. This function can be achieved by the spring device. The spring device acts on the four-bar linkage to move it back to its basic position. The basic position of the four-bar linkage therefore corresponds to the basic position of the tilting frame and thus the basic position of the line routing device.

The spring device can comprise one or more compression springs. Alternatively or additionally, the spring device can comprise one or more tension springs. For example, the spring device can be formed by two individual tension springs. Tension springs are assigned one to each of the two coupling rods. The respective tension spring acts on one side on a point on the frame of the supporting device and on the other side on a point on the tilting frame. The points at which the tension springs engage the frame and the tilting frame are selected in such a way that they exert a restoring moment on the tilting frame when the associated coupling rod is deflected from the basic position of the tilting frame. The two tension springs can act on the tilting frame at a common point, in particular in a middle area between the first spherical rotating joint and the third spherical rotating joint.

The spherical pivot bearing can comprise a ball head which is rotatably guided in a ball socket such that the ball head can be tilted by a tilt angle of up to 40 degrees.

The ball head of the spherical pivot bearing can comprise a ball pin which, in its installation position on the supporting device in its basic position, is arranged at least substantially perpendicular to the extension plane of the frame of the bearing arrangement and/or perpendicular to the extension plane of the tilting frame of the bearing arrangement. In such an installation position, the axis of rotation of the ball head about the axial extension of the ball pin corresponds to the pivoting of the line routing device about the first rotational degree of freedom or about the Z-axis, i.e., about the yaw axis of the line routing device. This ensures maximum pivotability of the line routing device about its yaw axis. Accordingly, the second rotational degree of freedom and, if applicable, the third rotational degree of freedom can be limited to a maximum of 40 degrees due to the limited tilt angle of the ball head.

The first spherical rotating joint, the second spherical rotating joint, the third spherical rotating joint and the fourth spherical rotating joint can generally be designed as joint heads. The joint heads can be designed in particular according to DIN ISO 12240-4.

Each coupling rod can comprise two joint heads, wherein the two joint head pins are connected opposite one another and facing each other via a rod or a sleeve. A ring-shaped outer part is attached to or molded onto the respective joint head pin. The annular outer part can comprise a seat for a bearing shell and can directly comprise a dome-shaped inner sliding surface for the ball head. The ball head can be designed to be cut off on the opposite side and, for example, can comprise a bore which forms a connection in order to be able to attach the respective ball head to the frame or to the tilting frame. The ball head can be formed by an inner ring with a spherical segment-shaped outer peripheral wall and a circular cylindrical inner peripheral wall.

The object is also achieved by a robot arm comprising multiple links and joints that adjust the links relative to one another, as well as a line routing device comprising a receiving space in which a line portion of an energy supply line is mounted so as to be extendable in an extension direction, for guiding the energy supply line along multiple the links of the robot arm, wherein the robot arm comprises a supporting device, as explained in one or more of the described embodiments, which supports the line routing device, in particular a casing of the line routing device, movably on a link of the robot arm in a forcibly coupled manner in two different rotational degrees of freedom, each oriented perpendicular to the extension direction of the line portion of the energy supply line.

The line routing device can comprise a casing; comprise a supply line guided through the casing in its axial longitudinal extension from a rear end to a front end, and comprise a spring device arranged within the casing, which spring device is designed to automatically return the supply line from an extended state of the supply line to a retracted state of the supply line by means of spring force, and which comprises a front end portion in the extension direction of the supply line and a rear end portion in the extension direction of the supply line, and a spring device seat which is firmly connected to the supply line and on which the rear end portion of the spring device is mounted, and a counter bearing seat which is connected to the casing and on which the front end portion of the spring device is mounted.

The line routing device for guiding at least one supply line along a robot arm is generally used when supply media are to be brought beyond the structure of the robot arm, for example to a tool held and guided by the robot arm. On the one hand, the supply line should run as close as possible to the structure of the robot arm in order to, among other things, increase the interference contour of the robot arm as little as possible. On the other hand, the supply line cannot run firmly along the robot arm over its entire length, since a certain reserve length is necessary for the supply line, since the robot arm sometimes reorients the tool and performs joint movements that the supply line must be able to follow without interference and without tension. Therefore, a certain reserve length for the supply line must be provided on the line routing device, wherein this reserve length should not hang down or protrude far from the robot arm, but should nevertheless run close to the contour of the robot arm, at least in the front area of the robot arm, i.e., in the area of its wrists, i.e., between the line routing device and the tool.

The line routing device is at least substantially arranged in a casing. The line routing device can be attached to a link of the robot arm via the casing.

A portion of the supply line is routed through the casing, namely through the casing along its axial longitudinal extension from a rear end of the casing to a front end of the casing. In the case of a cable-like bundle of wires, the casing can have a tubular or circular-cylindrical basic shape. The supply line runs preferably coaxial to the casing. The portion of the supply line that passes through the casing can therefore run in a circumferentially closed casing, wherein only the front sides of the casing in its tubular or circular-cylindrical casing basic form are open.

The supply line can, for example, comprise a protective hose which comprises one or more individual lines which are designed to supply robots and/or their guided tools with supply media, for example with electrical energy, hydraulic fluid, oil, water and/or compressed air. Such a supply line can be part of a so-called energy supply system. The energy supply line is generally pulled through a passage in order to bring these lines into a desired position near the robot arm. The supply line can be retracted using a spring device to prevent sagging lines from interfering with the working area of the robot arm.

The spring device can work passively. In the case of a passive return of an extended line portion, the spring device can, for example, comprise a spring coil which is relaxed or at least almost relaxed in the retracted state of the supply line and is under spring tension in the extended state, so that when an external tensile force on the supply line is removed, the spring coil relaxes and the supply line is moved back into the retracted state. When the portion of the supply line is fully extended, the spring coil may already be compressed to such an extent that it is close to its blocking state, in which case the spring coil would no longer have any spring-elastic properties, since the individual turns of the spring coil would then already be touching one another.

The rear end portion of the spring device is mounted on the spring device seat which is firmly connected to the supply line. The spring device seat can be formed, for example, by a two-part plastic ring comprising two half-shell bodies that are screwed together and thereby the plastic ring is attached, for example, to a protective hose of the supply line.

The spring device seat or the plastic ring can comprise a seat or stop on which the end portion of the spring device is mounted. Such support can be achieved at least by fixing a spring coil of the spring device in the axial direction, i.e., opposite to the extension direction. The rear end portion of the spring device or the rear end portion of the spring coil can thus be fixed with respect to the supply line, in particular with respect to the protective hose. The rear end portion of the spring device or the rear end portion of the spring coil can either be mounted so as to be rotatable about an axial axis with respect to the spring device seat or can be rigidly attached to the spring device seat. Instead of a spring device seat with seat or stop or a plastic ring with seat or stop, the spring device seat or the plastic ring can also be designed without a special seat or stop. For example, the spring device seat or the plastic ring can be designed as a protector known to a person skilled in the art.

The front end portion of the spring device is mounted on the counter bearing seat. The supply line can be mounted in a retractable and extendable, i.e., displaceable, manner through the counter bearing seat, particularly together with the protective hose. The spring device is mounted at its front end portion against the casing via the counter bearing seat.

If the supply line is pulled out of the casing of the line routing device due to a joint movement of the robot arm or a movement of the tool, the spring coil is compressed and a spring return force is generated. The casing can, for example, be designed as a two-part spring casing. The casing can, for example, protect the spring coil from dirt, damp noise and guide the spring coil or the extendable portion of the supply line linearly and without kinking. For assembly reasons, the spring holder is preferably designed in two parts and transfers the tensile force from the supply line to the spring coil. In order to protect the spring from blocking and thus prevent damage to the supply line, the maximum permissible extension path of the supply line must not be exceeded.

Specific embodiments of the invention are explained in more detail in the following description with reference to the accompanying drawings. Specific features of these embodiments, possibly considered individually or in further combinations, can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
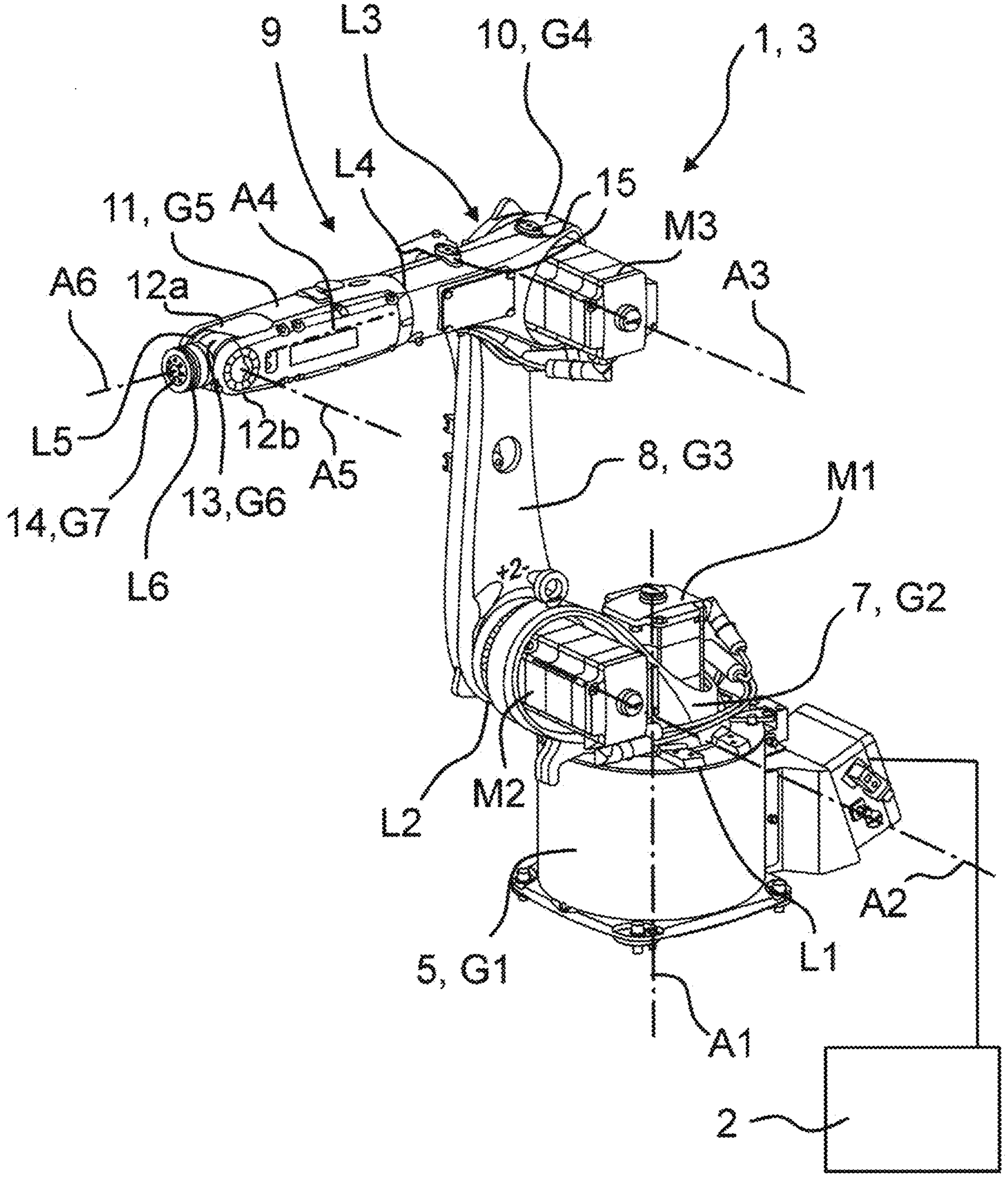
FIG. 1 shows a perspective view of an exemplary robot arm.

FIG. 1 shows an example of a robot 1 having a robot controller 2 and a robot arm 3. The robot arm 3 has a base frame 5 as a first link G1, on which a carousel 7, as a second link G2, is mounted so as to be rotatable about a first vertical axis A1, and is rotationally driven by means of a first drive motor M1. The axes A1-A6 of the robot arm 3 can also be referred to as joints L1-L6 of the robot arm 3. On the carousel 7, a link arm 8 is mounted as a third link G3 so as to be pivotable up and down about a second horizontal axis A2, and is rotationally driven by means of a second drive motor M2. The link arm 8 carries an arm extension 9, which is mounted so as to be pivotable up and down about a third horizontal axis A3 and is rotationally driven by means of a third drive motor M3. On the arm extension 9, whose base arm 10 forms a fourth link G4, a fourth axis A4 is provided which runs in the longitudinal extension of the arm extension 9 and, via a fourth drive motor (not shown), rotationally drives a front arm 11 which forms a fifth link G5. A first limb 12*a* and a second limb 12*b* extend forward in a fork shape from the front arm 11. The two limbs 12*a*, 12*b* carry a bearing for a hand 13, which forms a sixth link G6. The bearing defines a fifth axis A5 of the robot arm 3, about which the hand 13 can be pivotably moved by means of a fifth drive motor (not shown). In addition, the hand 13 has a sixth axis A6 in order to be able to rotationally drive a fastening flange 14, which forms a seventh link G7, by means of a sixth drive motor (not shown). Each axis A1 to A6 is assigned a joint L1 to L6, which joints L1 to L6, in the embodiment shown, connect the links G1 to G7 in the manner of a serial kinematic system of a kick arm robot. A supporting device 20 according to the invention can in particular be attached to the base arm 10, for example screwed to bearing domes 15.

In the case of the exemplary embodiment of FIG. 1, the robot arm 3 is shown in a joint position configuration which corresponds to a basic position of the robot arm 3. This basic position can also be called an adjustment position. The adjustment positions of the individual joints correspond to a 0-degree position in axes A1, A4, A5 and A6, a −90-degree position in axis A2 and a +90-degree position in axis A3. In this basic position of the robot arm 3 or this adjustment position of the robot arm, the arm extension 9, in particular the base arm 10, is oriented horizontally.

Figure 2:
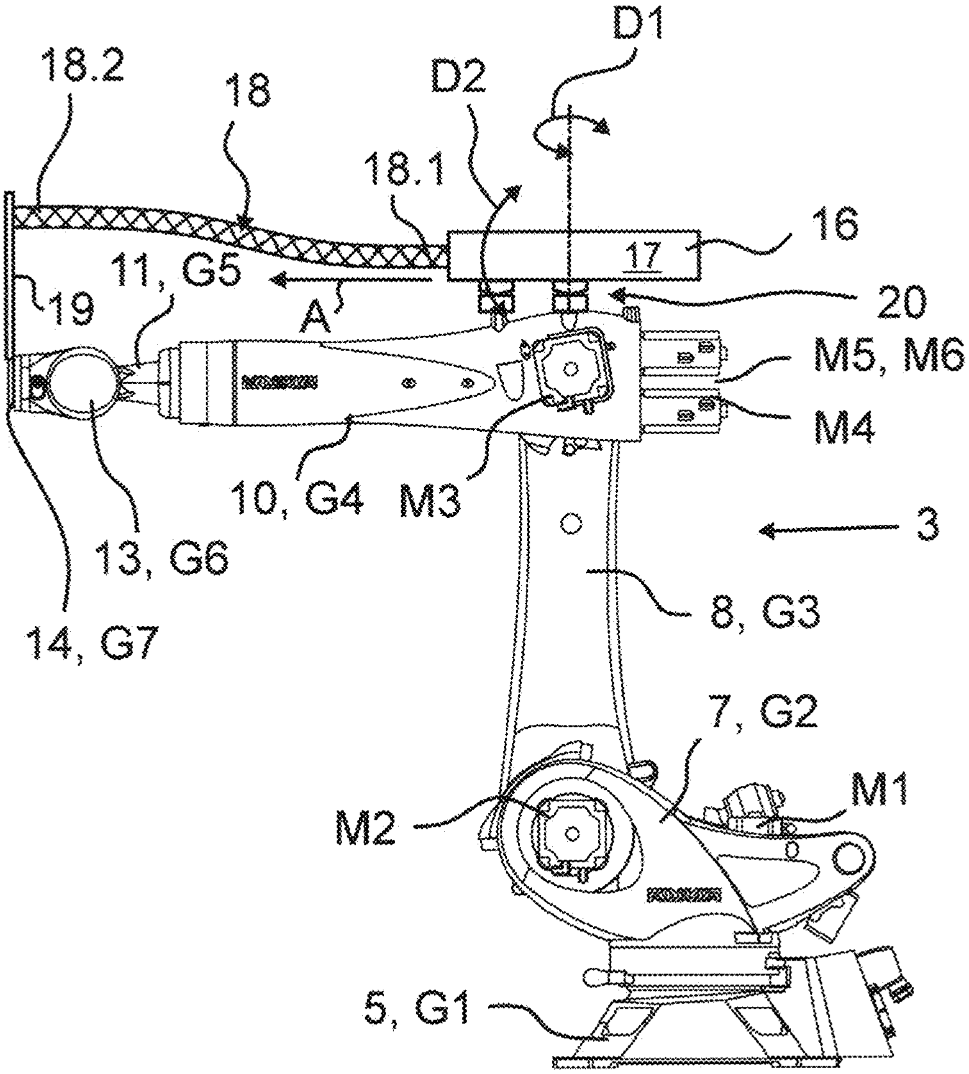
FIG. 2 shows a side view of a modified robot arm with a line routing device which is mounted by means of a supporting device according to the present disclosure.
Figure 3:
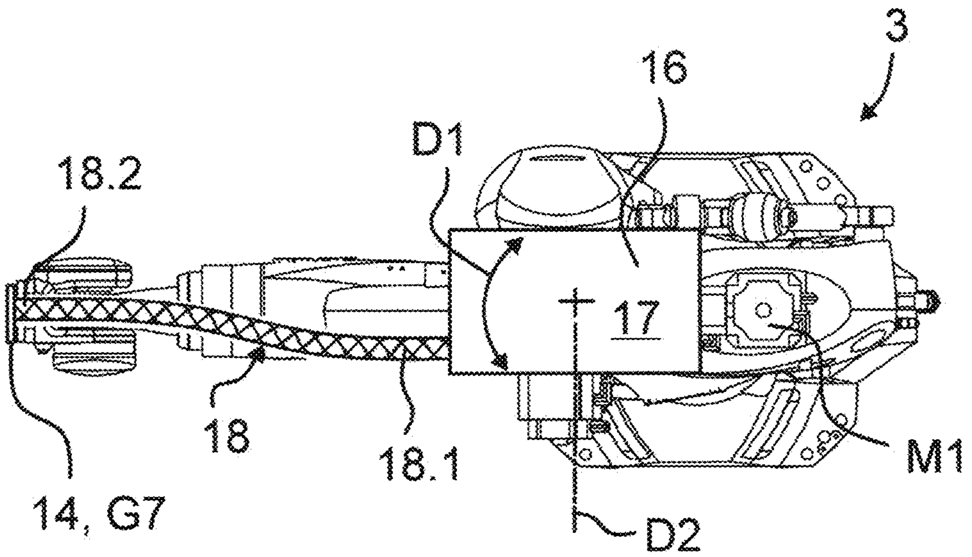
FIG. 3 shows a plan view of the robot arm according to FIG. 2 with the line routing device.
Figure 4:
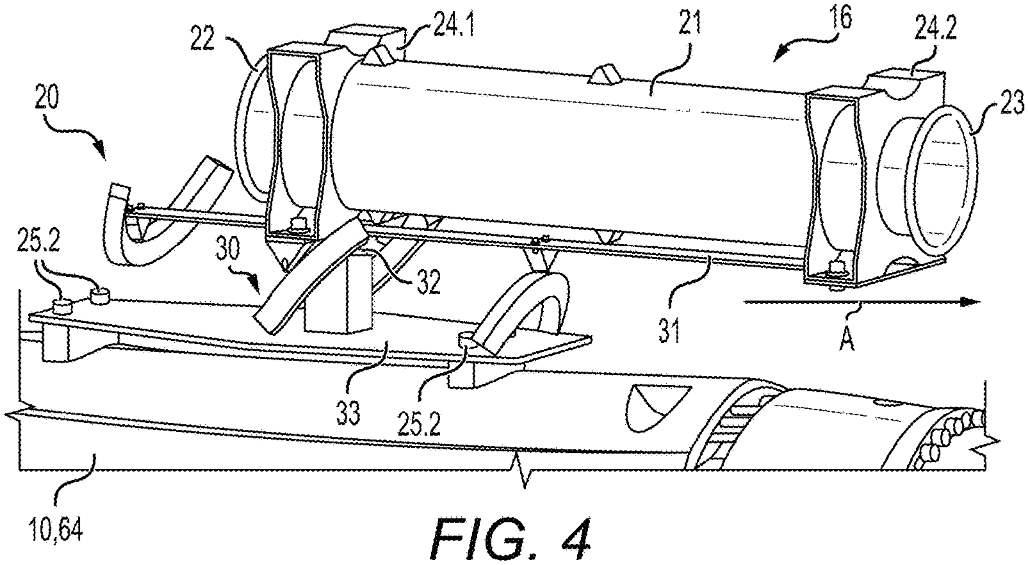
FIG. 4 shows a perspective view of a first basic embodiment of a supporting device with a forcibly guided spherical rotary guide for a line routing device on a robot arm with two forcibly guided rotational degrees of freedom.
Figure 5:
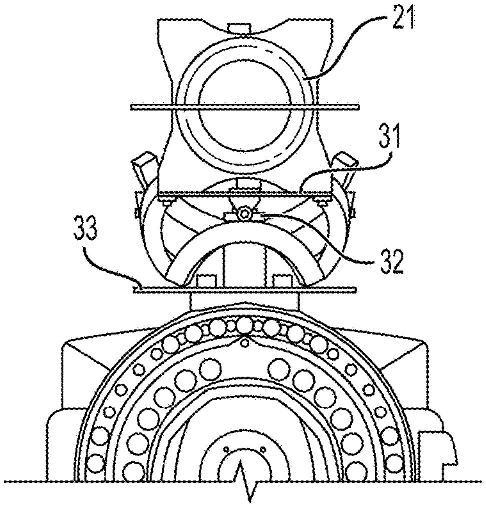
FIG. 5 shows a front view of the supporting device according to FIG. 4 in a basic position of the line routing device on the robot arm.
Figure 6:
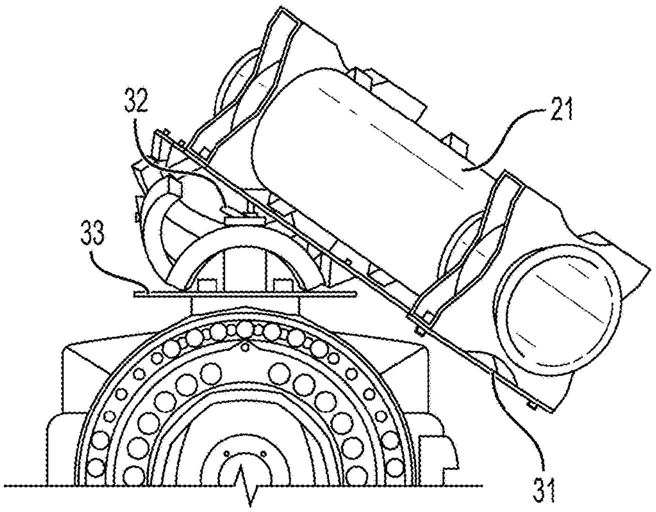
FIG. 6 shows a front view of the supporting device according to FIG. 4 in a deflected position of the line routing device on the robot arm.
Figure 7:
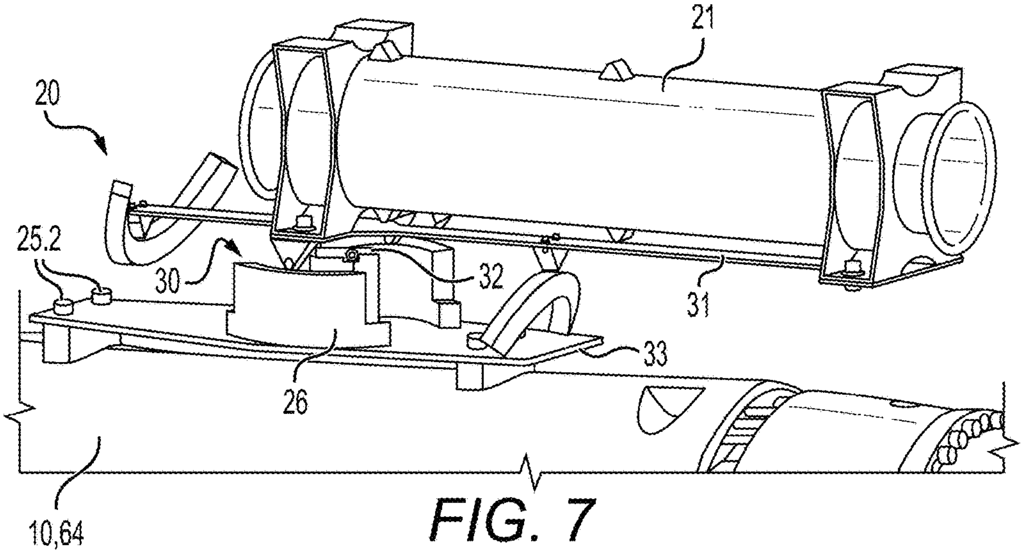
FIG. 7 shows a perspective view of a first basic embodiment of a supporting device with a forcibly guided spherical rotary guide for a line routing device on a robot arm with only one forcibly guided rotary degree of freedom.
Figure 8:
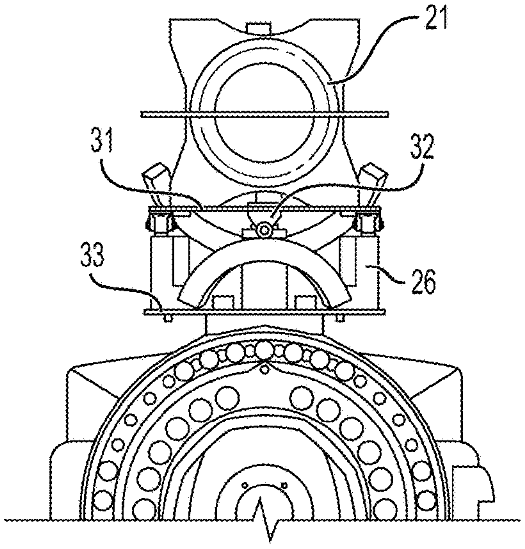
FIG. 8 shows a front view of the supporting device according to FIG. 7 in a basic position of the line routing device on the robot arm.
Figure 9:
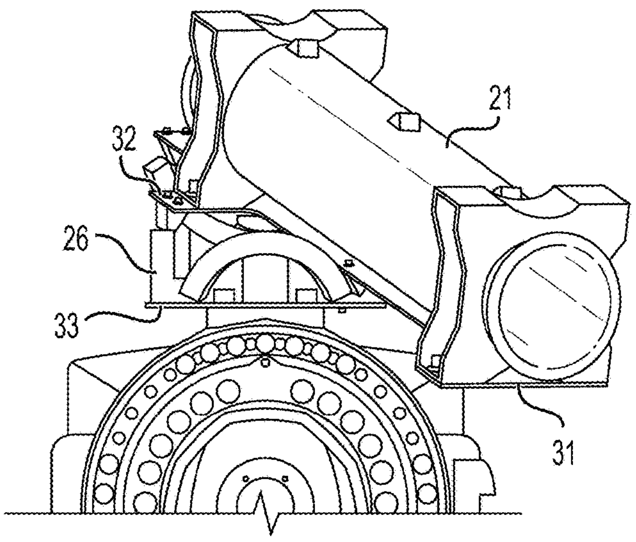
FIG. 9 shows a front view of the supporting device according to FIG. 7 in a deflected position of the line routing device on the robot arm.

In the case of the slightly modified exemplary embodiment of FIG. 2 and FIG. 3, the robot arm 3 also comprises the multiple links G1-G7 and joints L1-L6 which adjust the links G1-G7 relative to each other. Each joint L1-L6 is driven by a motor M1-M6 of the robot arm 3. A robot controller 2, not shown here in greater detail, can be provided to control the motors M in order to move the links G1-G7 of the robot arm 3 by automatically adjusting the joints L1-L6. In the case of the present exemplary embodiment, all joints L1-L6 of the robot arm 3 are designed as rotating joints. Each rotating joint can be rotated about an axis of rotation A1-A6. The robot arm 1 carries a line routing device 16 which comprises a receiving space 17 in which a line portion 18.1 of an energy supply line 18 is mounted so as to be extendable in an extension direction A. The energy supply line 18 comprises a line end 18.2, which in the case of the present exemplary embodiment is fixed with respect to the fastening flange 14 by means of a holder 19.

The robot arm 3 comprises a supporting device 20 according to the invention, which connects the line routing device 16 to the robot arm 3 in an articulated manner. The supporting device 20 is designed to movably support the line routing device 16 in at least two different rotational degrees of freedom D1 and D2, each oriented perpendicular to the extension direction A. The first rotational degree of freedom D1 enables the line routing device 16 to pivot freely about a vertical Z-axis (yaw axis). The second rotational degree of freedom D2 enables a forced pitching or rolling of the line routing device 16 about an X-axis and/or Y-axis lying in a horizontal plane.

In a variant of the line routing device 16, this can comprise a casing 21, as shown in particular in FIG. 4 to FIG. 9, which is designed in the form of a tube. The tube thus forms a contoured casing wall in which the line portion 18.1 is guided in the extension direction A (FIG. 2). In this case, the line routing device 16 or the casing 21 comprises a supply line 18 (not shown) guided through the casing 21 in its axial longitudinal extension from a rear end 22 to a front end 23, as well as a spring device (not shown) arranged within the casing 21, which is designed to automatically return the supply line 18 from an extended state of the supply line 18 to a retracted state of the supply line 18 by means of spring force. The casing 22 also comprises two bearing blocks 24.1, 24.2 with which the line routing device 16 in the case of the first basic embodiment according to FIG. 4 to FIG. 14 is attached to a wobble turntable 31 of the supporting device 20. In the case of the second basic embodiment according to FIG. 15 to FIG. 21 later described in greater detail the line routing device 16 is attached to a tilting frame 41 by means of the bearing blocks 24.1, 24.2.

The line routing device 16 comprises the receiving space 17 in which the line portion 18.1 is mounted so that it can be extended in the extension direction A. The supporting device 20 serves to support or attach the line routing device 16 on/to a link G1-G7 of the robot arm 3. In the case of the present exemplary embodiments, the line routing device 16 is always mounted on the base arm 10 of the robot arm 3 by means of the supporting device 20.

The supporting device 20 generally comprises a first connection body 25.1, which is designed to rigidly connect the first connection body 25.1 of the supporting device 20 to the line routing device 16.

The supporting device 20 also comprises a second connection body 25.2, which is designed to rigidly connect the second connection body 25.2 of the supporting device 20 to a link G1-G7 of the robot arm 1, in the case of the present exemplary embodiments on the base arm 10 of robot arm 3.

The supporting device 20 further comprises a bearing arrangement 26 which is designed to guide the first connection body 25.1 relative to the second connection body 25.2 in a first rotational degree of freedom D1, which is oriented perpendicular to the extension direction A, and to support it in a second rotational degree of freedom D2, which is oriented perpendicular to both the extension direction A and perpendicular to the first rotational degree of freedom D1, depending on the movement of the first connection body 25.1 about the first rotational degree of freedom D1.

The bearing arrangement 26 is designed to firmly support the second connection body 25.2 relative to the first connection body 25.1 in all three degrees of freedom of thrust.

Depending on the embodiment, the bearing arrangement 26 can be designed to support the first connection body 25.1 relative to the second connection body 25.2 in a third rotational degree of freedom D3 rotating about the extension direction A depending on the movement of the first connection body 25.1 about the first rotational degree of freedom D1.

In the case of the embodiment according to FIG. 4 to FIG. 14, the bearing arrangement 26 is designed as a forcibly guided spherical rotary guide 30.

In the case of the embodiment according to FIG. 15 to FIG. 21, however, the bearing arrangement 26 is designed as a spatial coupling gear 40.

In the embodiment according to FIG. 4 to FIG. 14, the bearing arrangement 26, in particular the forcibly guided spherical rotary guide 30, comprises a wobble turntable 31 which is mounted on a frame 33 by means of a centrally arranged spherical rotary bearing 32 with three rotational degrees of freedom and is mounted in a forcibly guided manner on the circumference on a circumferential guide 34 connected to the frame 33.

Figure 10:
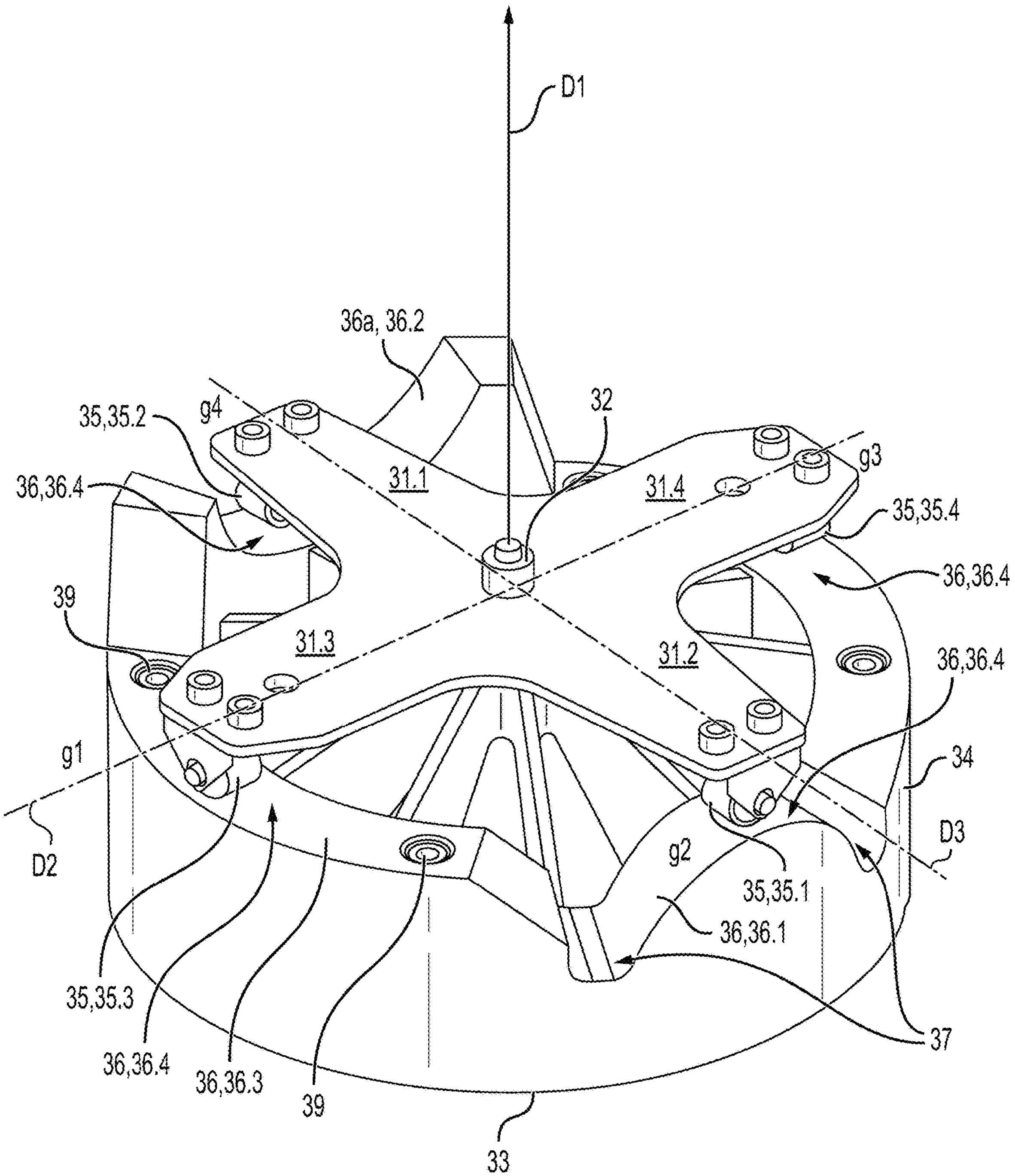
FIG. 10 shows a perspective view of a circumferential guide of the first basic embodiment in a stand-alone position together with a wobble turntable.
Figure 11:
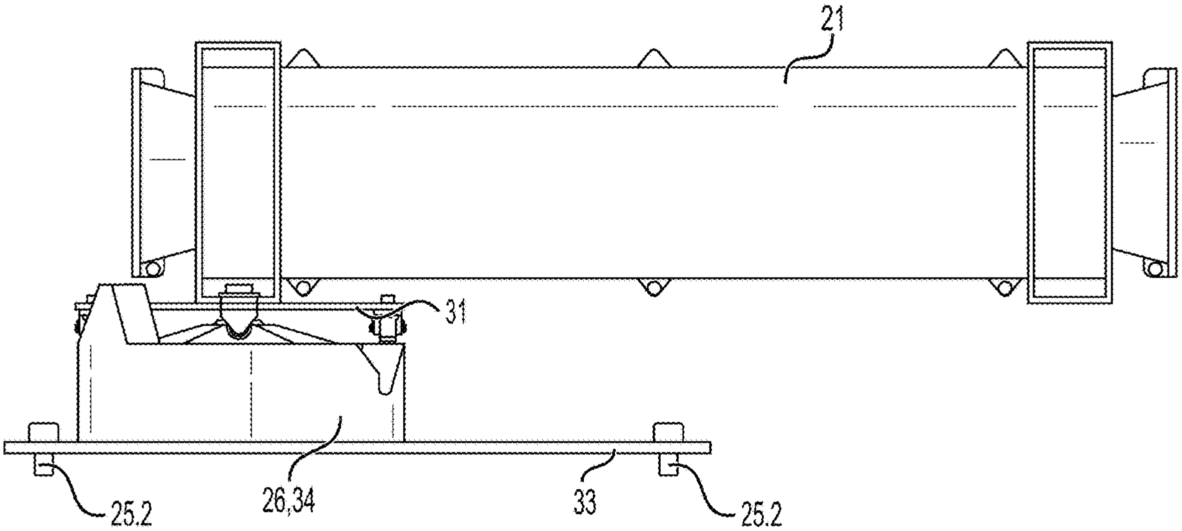
FIG. 11 shows a side view of the first basic embodiment with a circumferential guide according to FIG. 10.

As can best be seen in FIG. 10, the main joint is a centrally located ball joint with a joint degree of freedom f=3. The rollers 35.1, 35.2, 35.3, 35.4 forming the guide track followers 35 are mounted around this ball joint at 90 degree intervals, each with a joint degree of freedom f=4. These rollers 35.1, 35.2, 35.3, 35.4 scan a spatially curved guide track 36. The guide track 36 is designed such that the line routing device 16 can move around the robot arm 3 without collision. By simultaneously scanning a complementary guide track 36*a*, forced running is achieved. The axes of the rollers 35.1, 35.2, 35.3, 35.4 intersect in the center of the ball joint (spherical pivot bearing 32). In addition, the axes of the rollers 35.1, 35.2, 35.3, 35.4 are oriented with each other in pairs. Since all axes of the rollers 35.1, 35.2, 35.3, 35.4 intersect at one point and the movement path of the link points lies on concentric spherical shells, this is a spherical arrangement.

The wobble turntable 31 can have a cross-shaped form, as shown in particular in FIG. 10. The wobble turntable 31 can accordingly comprise, for example, four arms 31.1, 31.2, 31.3, 31.4 which are arranged offset from one another by 90 degrees and which extend outwards at least substantially radially from the centrally arranged spherical pivot bearing 32. The forcibly guided bearing in the form of the rollers 35.1, 35.2, 35.3, 35.4 and the guide tracks 36 can be arranged at a respective free end of each arm 31.1, 31.2, 31.3, 31.4.

The circumferential guide 34 thus comprises at least one guide track 36 connected to the frame 33 or several guide tracks 36 on which the guide track followers 35, i.e., the rollers 35.1, 35.2, 35.3, 35.4, move, wherein these are connected to the wobble turntable 31.

A corresponding forced guidance can therefore be achieved in that the wobble turntable 31 comprises two opposite arms 31.2 and 31.4 or 31.1 and 31.3 extending away from each other, in each case in pairs, which are each equipped with a roller 35.1, 35.2, 35.3, 35.4. Each of the two pairs of rollers 35.2 and 35.4 or 35.1 and 35.3 runs on its own guide track 36 and complementary guide track 36*a*. The first roller 35.1 runs on a first guide track 36.1 of a first contour, which determines the movement of the wobble turntable 31 about the forcibly guided (second) rotational degree of freedom D2. The opposite second roller 35.2 runs on a second guide track 36.2 of a second contour, the complementary guide track 36*a*, which is mirrored point-symmetrically to the first contour of the first guide track 36.1. By supporting the second roller 35.2 on the second guide track 36.2, the first roller 35.1 is prevented from lifting off the first guide track 36.1 due to the leverage of the arms 31.1 and 31.2 of the wobble turntable 31. In this way, a forced guidance is ensured, for example, about the second rotational degree of freedom D2.

If a forced guidance is also to be ensured for the third rotational degree of freedom D3, this can be achieved by the wobble turntable 31 comprising two opposing, mutually extending additional arms 31.3 and 31.4, each of which is equipped with an additional roller 35.3 and 35.4. Each of the two rollers 35.3 and 35.4 runs on its own guide track 36.3 and 36.4. The third roller 35.3 runs on a third guide track 36.3 of a third contour, which determines the movement of the wobble turntable 31 about the forcibly guided (third) rotational degree of freedom D3. The fourth roller 35.4 opposite the third roller 35.3 runs on a fourth guide track 36.4 of a fourth contour, which is mirrored point-symmetrically to the third contour of the third guide track 36.3. By supporting the fourth roller 35.4 on the fourth guide track 36.4, the third roller 35.3 is prevented from lifting off the third guide track 36.3. If a changing forced guidance, i.e., a forced movement about the third rotational degree of freedom D3 is not required, as is the case, for example, in the embodiment shown in FIG. 10, both the third guide track 36.3 and the fourth guide track 36.4 can be flat, as shown in FIG. 10, and extend in the same plane.

In a special design variant with only a first guide track follower 35 (first roller 35.1) and a second guide track follower 35 (second roller 35.2), the wobble turntable 31 can be designed not to allow rotation about the third rotational degree of freedom D3, i.e., to structurally prevent or block it. For this purpose, the wobble turntable 31 can comprise a third guide track follower 35 (third roller 35.3) which moves on a third track portion of the guide track 36 and a fourth guide track follower 35 (fourth roller 35.4) arranged opposite the third guide track follower 35 (third roller 35.3) which moves on a fourth track portion of the guide track 36. However, in this special design variant, the third track portion and the fourth track portion are designed as flat tracks, which preferably both lie in the same spatial plane and this spatial plane is oriented, for example, parallel to the extension direction (X-axis) and parallel to the pitch axis (Y-axis). In other words, the flat tracks of the third track portion and the fourth track portion extend at least substantially perpendicular to the yaw axis (Z-axis). In this limited mobility of the wobble turntable 31, the line routing device 16 can therefore only rotate about the yaw axis (Z-axis) and, depending on this, can only rotate about the pitch axis (Y-axis). The line routing device 16 therefore remains constant with respect to a rolling movement, i.e., a rotation about the extension direction (X-axis).

The wobble turntable 31 can comprise a third guide track follower 35 (third roller 35.3) which moves on a third track portion of the guide track 36 and the wobble turntable 31 can comprise a fourth guide track follower 35 (fourth roller 35.4) arranged opposite the third guide track follower 35 (third roller 35.3) which moves on a fourth track portion of the guide track 36, wherein the track of the third track portion is complementary to the track of the fourth track portion, such that a play-free rotation of the wobble turntable 31 about the third rotational degree of freedom D3 takes place when the wobble turntable 31 rotates about the first rotational degree of freedom D1.

Figure 12:
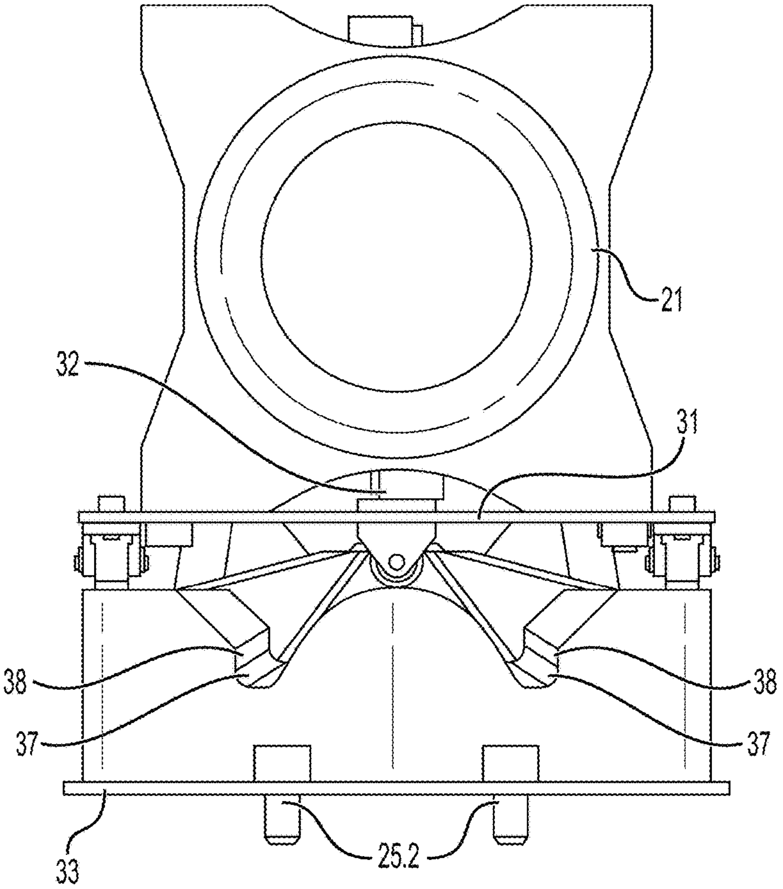
FIG. 12 shows a front view of the first basic embodiment with a circumferential guide according to FIG. 10 in the basic position.
Figure 13:
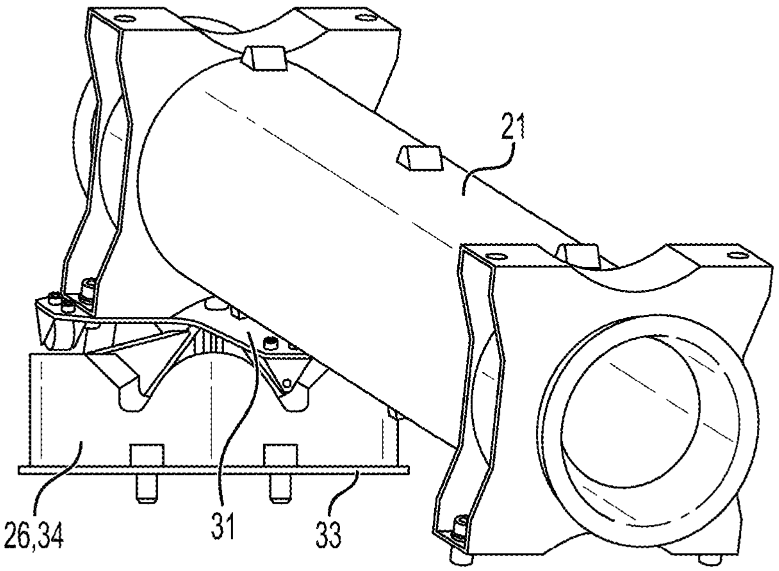
FIG. 13 shows a perspective view of the first basic embodiment with a circumferential guide according to FIG. 10 in the deflected position.
Figure 14:
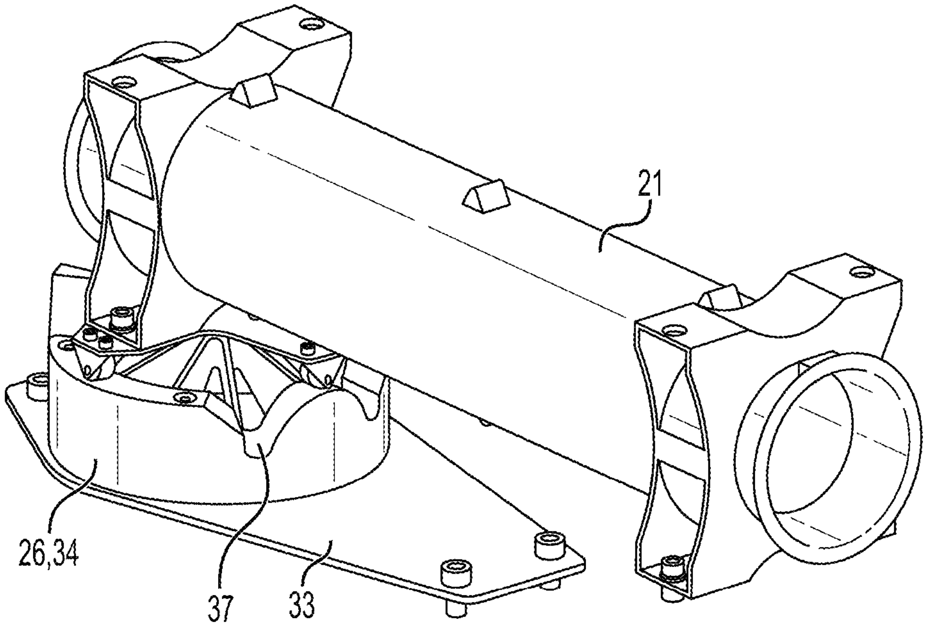
FIG. 14 shows a perspective view of the first basic embodiment with a circumferential guide according to FIG. 10 in the basic position.

As can be seen in particular in FIG. 10 and FIG. 12, the guide track 36 can comprise at least one locking stop 37 which is designed to limit a rotational movement of the wobble turntable 31 about the first rotational degree of freedom D1 to a rotation angle of less than 90 degrees.

When the design-specified rotation angle limit is reached, the corresponding roller 35.1, 35.2, 35.3, 35.4 engages in the locking stop 37. A vertical stop wall 38 can prevent further rotation beyond the specified rotation angle limit.

The guide track 36 or the circumferential guide 34 as such can be interchangeably attached to the frame 33 by means of detachable fastening means 39. The detachable fastening means 39 can in particular be fastening means that can be loosened or tightened by a fitter using hand tools. For example, the detachable fastening means 39, as shown in FIG. 10, can be screws or studs in combination with nuts.

In the second basic embodiment according to FIG. 15 to FIG. 21, the bearing arrangement 26 is designed as a spatial coupling gear 40.

The second basic embodiment of a supporting device 20 or a bearing arrangement 26 may comprise a tilting frame 41. The tilting frame 41 corresponds functionally to the wobble turntable 31 according to the first basic embodiment of a supporting device 20 or a bearing arrangement 26. The tilting frame 41 can optionally be formed from rigid struts or be designed as a solid body. In the case of a solid body, the tilting frame 41 can also be a plate or a flat sheet of metal. The tilting frame 41 is mounted on the frame 33 of the supporting device 20 via the spatial coupling gear 40.

The bearing arrangement 26 of the second basic embodiment, in particular the spatial coupling gear 40, comprises the tilting frame 41, which is mounted on a frame 43 at a first end portion 41.1 of the tilting frame 41 by means of a spherical pivot bearing 42 with three rotational degrees of freedom and is mounted on the frame 43 at a second end portion 41.2 of the tilting frame 41 opposite the first end portion 41.1 of the tilting frame 41 by means of a four-bar linkage 44.

The spherical pivot bearing 42 can also be referred to as a ball joint. The spherical pivot bearing 42, i.e., the ball joint, is distinguished in that it allows rotations in all three rotational degrees of freedom (Cartesian coordinate system), but blocks all three degrees of freedom of thrust (linear X-direction, linear Y-direction and linear Z-direction). The spherical pivot bearing 42 can be arranged on the tilting frame 41 in such a position that, when the line routing device 16 is fastened to the tilting frame 41, it is positioned at least substantially below a rear end of the receiving space 17 for the line portion 18.1 of the line routing device 16 with respect to the extension direction A.

The four-bar linkage 44 can span a joint plane which is oriented at least substantially perpendicular to the extension direction A of the line portion 18.1 of the line routing device 16 from the receiving space 17 when the line routing device 16 is fastened to the tilting frame 41. The joint plane of the four-bar linkage 44 is preferably located at a middle height of the longitudinal extension of the receiving space 17 of the line routing device 16. The longitudinal extension of the receiving space 17 corresponds to the extension direction A of the line portion 18.1.

The four-bar linkage 44 comprises a total of four spherical rotating joints 45. A first spherical rotating joint 45.1 connects a first coupling link 46.1 to the tilting frame 41. A second spherical rotating joint 45.2 connects the first coupling link 46.1 to the frame 43. A third spherical rotating joint 45.3 connects the tilting frame 41 to a second coupling link 46.2. A fourth spherical rotating joint 45.4 connects the second coupling link 46.2 to the frame 43. The second spherical rotating joint 45.2 and the fourth spherical rotating joint 45.4 are spaced apart from each other. Likewise, the first spherical rotating joint 45.1 and the third spherical rotating joint 45.3 are arranged at a distance from each other. The distance of the second spherical rotating joint 45.2 from the fourth spherical rotating joint 45.4 can in particular be smaller than the distance of the first spherical rotating joint 45.1 from the third spherical rotating joint 45.3.

The four-bar linkage 44 accordingly comprises a first coupling rod **46*a*, at the distal first rod end of which a first spherical rotating joint 45.1 is arranged, coupling the first coupling rod 46*a* to the tilting frame 41, and at the proximal second rod end of which a second spherical rotating joint 45.2 is arranged, coupling the first coupling rod 46*a* to the frame 43, and the four-bar linkage 44 comprises a second coupling rod 46*b*, at the distal third rod end of which a third spherical rotating joint 45.3 is arranged, coupling the second coupling rod 46*b* to the tilting frame 41, and at the proximal fourth rod end of which a fourth spherical rotating joint 45.4 is arranged, coupling the second coupling rod 46*b* to the frame 43**.

In this embodiment, the first coupling link 46.1 is formed by a first coupling rod **46*a* and the second coupling link 46.2 is formed by a second coupling rod 46*b*. Proximal means that the rod end in question faces the frame 43, i.e., is closer to the robot arm 3. Distal means that the rod end in question faces the tilting frame 41, i.e., is further away from the robot arm 3, i.e., is closer to the line routing device 16. Both the first coupling rod 46*a* and the second coupling rod 46*b* are rigid. In particular, the first coupling rod 46*a* and the second coupling rod 46*b*** have the same effective lengths.

The first spherical rotating joint 45.1 and the second spherical rotating joint 45.2 of the first coupling rod **46*a*, as well as the third spherical rotating joint 45.3 and the fourth spherical rotating joint 45.4 of the second coupling rod 46*b* can be designed as joint heads. The joint heads can be designed in particular according to DIN ISO 12240-4. The first spherical rotating joint 45.1 and the second spherical rotating joint 45.2 of the first coupling rod 46*a*, as well as the third spherical rotating joint 45.3 and the fourth spherical rotating joint 45.4 of the second coupling rod 46*b*** form ball joints in this respect.

Figure 15:
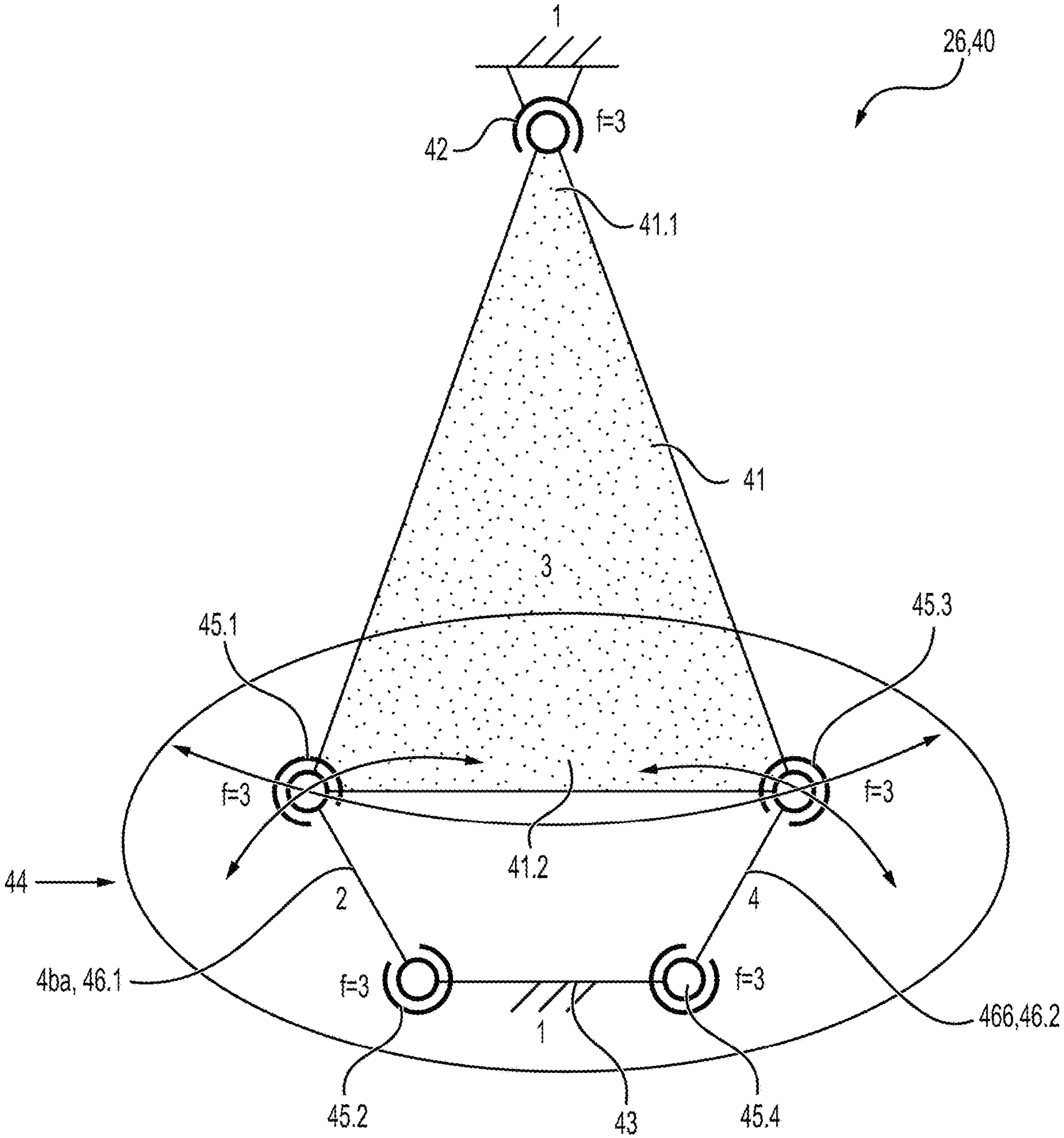
FIG. 15 shows a schematic representation of a coupling gear of a bearing arrangement of the supporting device in the second basic embodiment.
Figure 16:
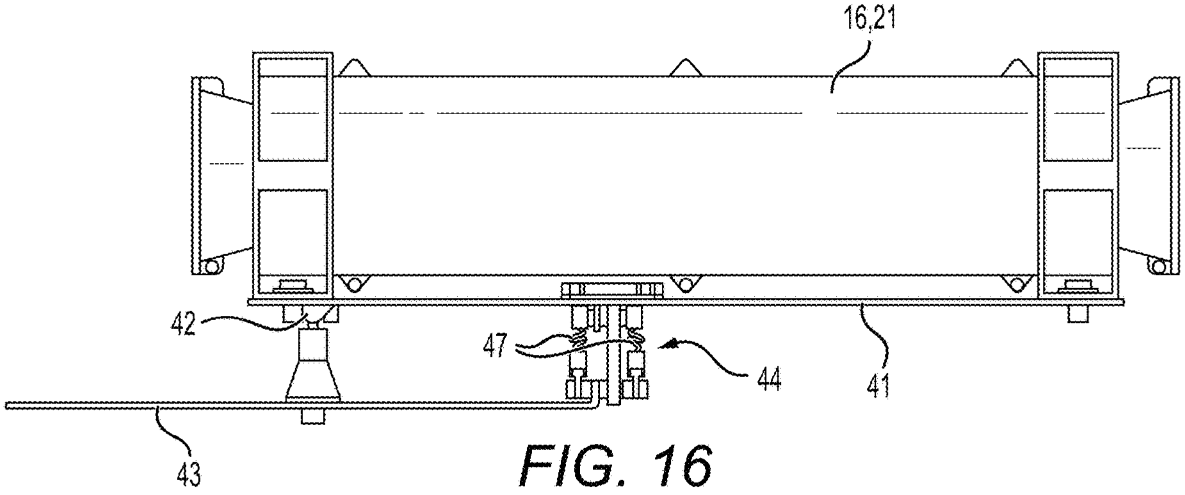
FIG. 16 shows a side view of a second basic embodiment of a supporting device with a tilting frame for a line routing device, which is mounted on a robot arm by means of a spherical pivot bearing and a four-bar linkage as a coupling gear.

The second spherical rotating joint 45.2 of the first coupling rod **46*a* and the fourth spherical rotating joint 45.4 of the second coupling rod 46*b* are, as shown in particular in FIG. 15, positioned at a smaller distance from one another on the frame 43 than the first spherical rotating joint 45.1 of the first coupling rod 46*a* and the third spherical rotating joint 45.3 of the second coupling rod 46*b* are arranged at a distance from one another on the tilting frame 41**.

The spherical pivot bearing 42 is arranged at a distance from the outlet opening of the receiving space 17 which is two to three times greater than the distance of the four-bar linkage 44 from the spherical pivot bearing 42. This is shown in particular in FIG. 16 and FIG. 19.

In a basic position of the tilting frame 41 according to FIG. 16, FIG. 17, FIG. 19 and FIG. 20, the latter is oriented with its main extension plane parallel to the main extension plane of the frame 43. This also corresponds to a basic position of the line routing device 16 when it is fastened to the tilting frame 41. In a basic position of the robot arm 3

(FIG. 1), for example, an arm extension 9 of the robot arm 3 is oriented horizontally. When the supporting device 20 and thus also the line routing device 16 are attached to the arm extension 9 of the robot arm 3, the tilting frame 41 also extends in a horizontal plane in its basic position. Accordingly, the line routing device 16 then also extends in a horizontal plane. This consequently means that in the basic position the extension direction A of the line routing device 16 also runs horizontally.

If the line portion 18.1 is now pulled out of the receiving space 17 at an angle to the extension direction A of the line routing device 16 by a pulling movement triggered by a movement of the robot hand in space, which guides the front end of the line 18, lateral forces act on the casing 21 of the line routing device 16, so that the latter can rotate sideways due to the free first rotational degree of freedom D1 of the supporting device 20, which immediately causes the tilting frame 41 and thus also the line routing device 16 to tilt downwards and/or rotate axially due to the forced second rotational degree of freedom D2 and/or third rotational degree of freedom D3. This then corresponds to a pitching or rolling of the line routing device 16, which is superimposed on the pivoting movement of the line routing device 16.

Figure 17:
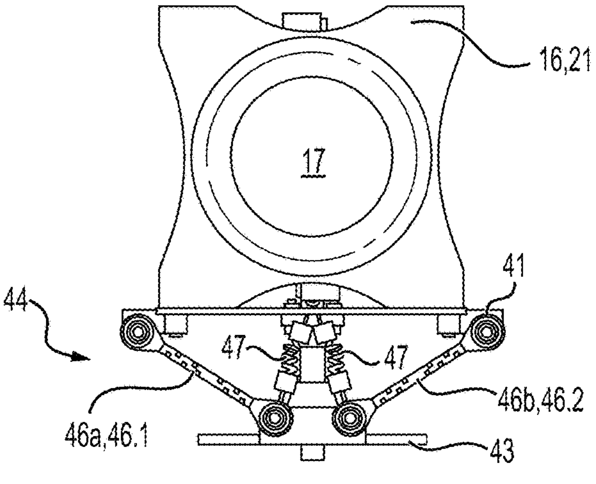
FIG. 17 shows a front view of the supporting device according to FIG. 16 in a basic position of the line routing device.
Figure 18:
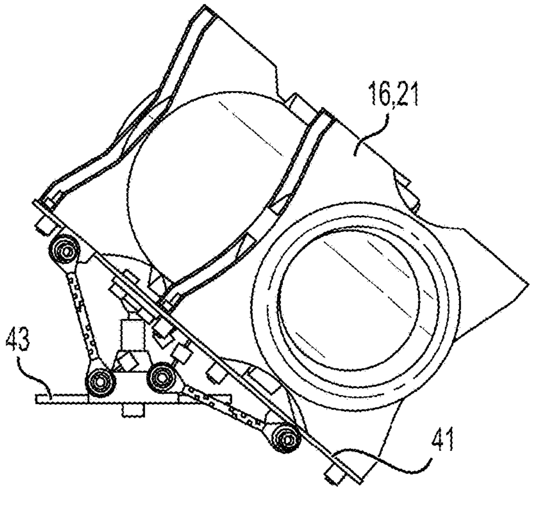
FIG. 18 shows a front view of the supporting device according to FIG. 16 in a deflected position of the line routing device.
Figure 19:
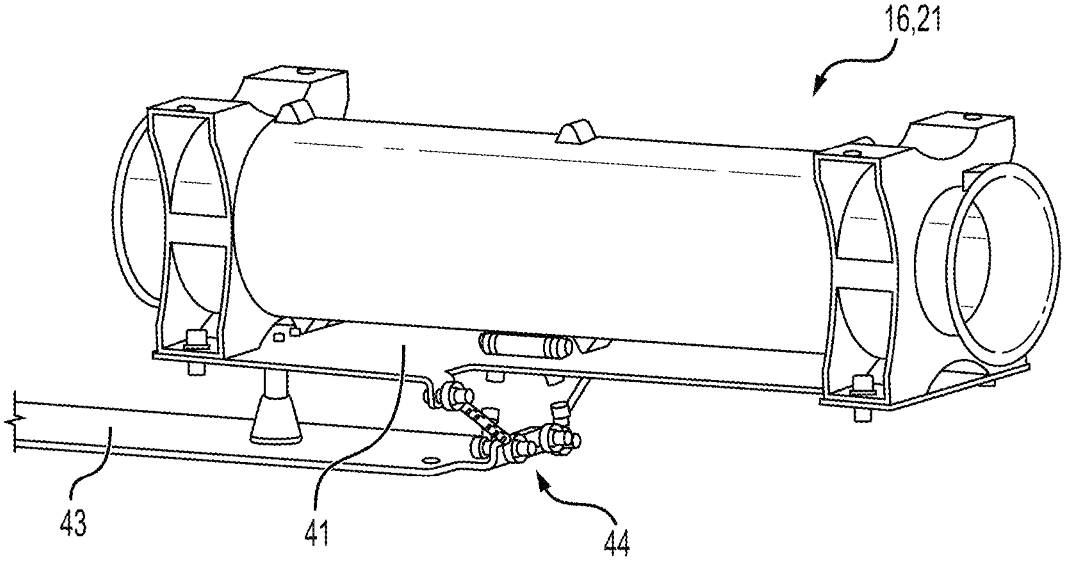
FIG. 19 shows a perspective view of the second basic embodiment according to FIG. 16.
Figure 20:
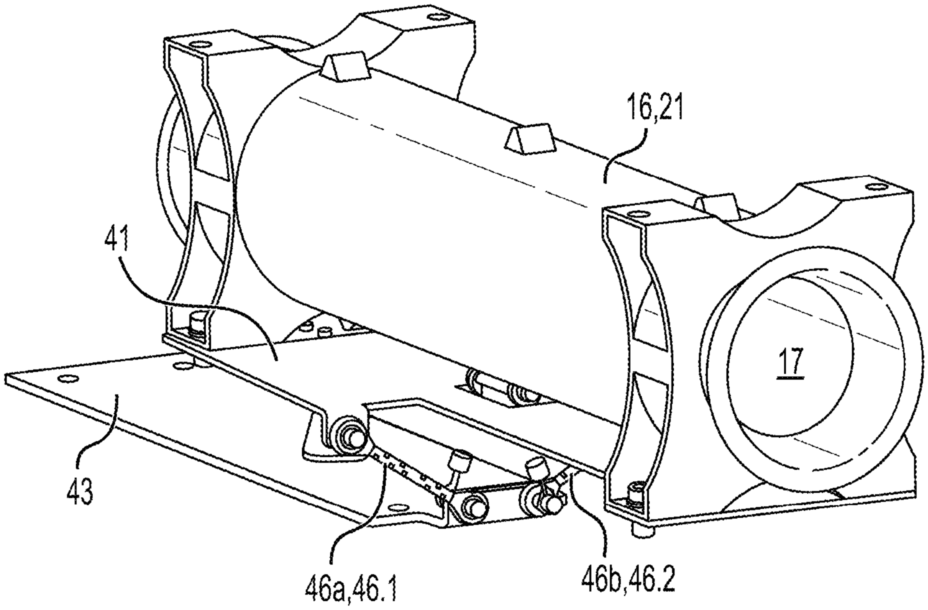
FIG. 20 shows another perspective view of the second basic embodiment according to FIG. 16 in the basic position.

The four-bar linkage can, as can be seen in particular in FIG. 17, comprise a spring device 47 which is designed to hold the tilting frame 41 in a central basic position with respect to the frame 43 when no external forces act on the supporting device 20.

If, by a relieving movement of the robot hand in the space which guides the front end of the line 18, the line portion 18.1 is pulled back into the receiving space 17 against the extension direction A of the line routing device 16, no more lateral forces act on the casing 21 of the line routing device 16 or at least only smaller lateral forces act on the casing 21 of the line routing device 16. In this case, it may be desired that the line routing device 16 automatically returns to its initial position, i.e., its basic position (see FIG. 17, for example). This function can be achieved by the spring device 47. The spring device 47 acts on the four-bar linkage 44 to move it back to its basic position. The basic position of the four-bar linkage 44 therefore corresponds to the basic position of the tilting frame 41 and thus to the basic position of the line routing device 16.

The spherical pivot bearing 42 may comprise a ball head which is rotatably guided in a ball socket such that the ball head is mounted so as to be tiltable by a tilt angle of up to 40 degrees.

The first spherical rotating joint 45.1, the second spherical rotating joint 45.2, the third spherical rotating joint 45.3 and the fourth spherical rotating joint 45.4 can be designed as joint heads.

Figure 21:
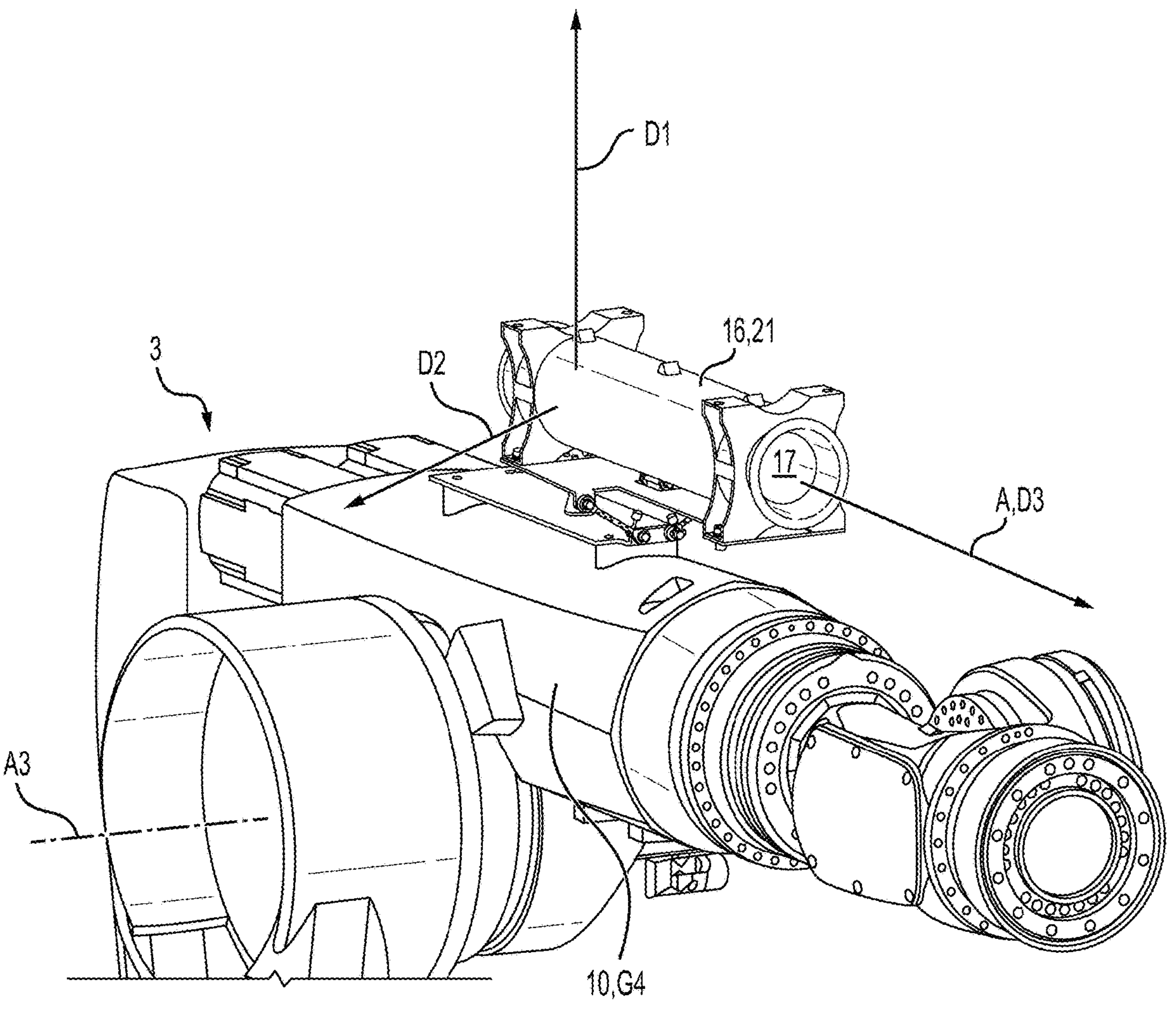
FIG. 21 shows a perspective view of the line routing device according to FIG. 16 on a robot arm.

FIG. 21 shows the robot arm 3, comprising several links G1-G7 and joints L1-L6 that adjust the links G1-G7 relative to each other, as well as the line routing device 16, which comprises a receiving space 17 in which a line portion of an energy supply line (not shown) is mounted so that it can be pulled out in an extension direction A, for guiding the energy supply line along several of the links G1-G7 of the robot arm 3, wherein the robot arm 3 comprises a supporting device 16, which supports the line routing device 16 movably, for example on the link 10, G4 of the robot arm 3, in a forcibly coupled manner in at least two different rotational degrees of freedom D1, D2, D3, each oriented perpendicular to the extension direction A of the energy supply line.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A supporting device for an elongate line routing device of a robot arm, wherein the line routing device includes a receiving space in which a portion of the line is mounted so as to be extendable in an extension direction corresponding to a longitudinal direction of the line routing device, the supporting device comprising:

a first connection body designed to rigidly connect the first connection body to a line routing device;

a second connection body designed to rigidly connect the second connection body to a link of a robot arm; and a bearing arrangement designed to guide the first connection body for movement relative to the second connection body in a first rotational degree of freedom about a first rotation axis oriented perpendicular to the extension direction and to support the first connection body for movement in a forcibly guided manner in a second rotational degree of freedom about a second rotation axis oriented perpendicular to both the extension direction and the first rotation axis, wherein the movement in the second rotational degree of freedom is dependent on the movement of the first connection body about the first rotational degree of freedom.

2. The supporting device according to claim 1, wherein the bearing arrangement is designed to firmly support the second connection body relative to the first connection body in all three degrees of freedom of thrust.

3. The supporting device according to claim 1, wherein the bearing arrangement is designed to support the first connection body relative to the second connection body for movement in a third rotational degree of freedom about a third rotation axis corresponding to the extension direction, wherein the movement in the third rotational degree of freedom is dependent on the movement of the first connection body about the first rotational degree of freedom.

4. The supporting device according to claim 1, wherein the bearing arrangement is designed as a forcibly guided spherical rotary guide.

5. The supporting device according to claim 4, wherein the bearing arrangement comprises a wobble turntable which is mounted on a frame by a centrally arranged spherical rotary bearing with three rotational degrees of freedom, and is mounted in a forcibly guided manner on a circumference of a circumferential guide connected to the frame.

6. The supporting device according to claim 5, wherein:

the circumferential guide comprises a guide track connected to the frame; and at least one guide track follower connected to the wobble turntable moves on the guide track.

7. The supporting device according to claim 6, wherein the at least one guide track follower comprises a roller rotatably mounted on the wobble turntable and which rolls on the guide track.

8. The supporting device according to claim 6, wherein:
the wobble turntable comprises a first guide track follower which moves on a first track portion of the guide track;
the wobble turntable comprises a second guide track follower arranged opposite the first guide track follower and which moves on a second track portion of the guide track; and
the track of the first track portion is designed to be complementary to the track of the second track portion, such that a play-free rotation of the wobble turntable about the second rotational degree of freedom takes place when the wobble turntable rotates about the first rotational degree of freedom.

9. The supporting device according to claim 6, wherein:
the wobble turntable comprises a third guide track follower which moves on a third track portion of the guide track;
the wobble turntable comprises a fourth guide track follower arranged opposite the third guide track follower and which moves on a fourth track portion of the guide track; and
the track of the third track portion is designed to be complementary to the track of the fourth track portion, such that a play-free rotation of the wobble turntable about the third rotational degree of freedom takes place when the wobble turntable rotates about the first rotational degree of freedom.

10. The supporting device according to claim 5, wherein the guide track comprises at least one locking stop designed to limit a rotational movement of the wobble turntable about the first rotational degree of freedom to a rotation angle of less than 90 degrees.

11. The supporting device according to claim 5, wherein the guide track is replaceably attached to the frame by detachable fastening means.

12. The supporting device according to claim 1, wherein the bearing arrangement is designed as a spatial coupling gear.

13. The supporting device according to claim 1, wherein:
the bearing arrangement comprises a tilting frame mounted on a frame at a first end portion of the tilting frame by a spherical pivot bearing with three rotational degrees of freedom and is mounted on the frame at a second end portion of the tilting frame opposite the first end portion by a four-bar linkage.

14. The supporting device according to claim 13, wherein the four-bar linkage comprises:
a first coupling rod having a first spherical rotating joint arranged at a distal first rod end thereof, the first spherical rotating joint coupling the first coupling rod to the tilting frame;
the first coupling rod having a second spherical rotating joint arranged at a proximal second rod end thereof and coupling the first coupling rod to the frame;
a second coupling rod having a third spherical rotating joint arranged at a distal third rod end and coupling the second coupling rod to the tilting frame; and
the second coupling rod having a fourth spherical rotating joint arranged at a proximal fourth rod end and coupling the second coupling rod to the frame.

15. The supporting device according to claim 14, wherein:
the second spherical rotating joint of the first coupling rod and the fourth spherical rotating joint of the second coupling rod are arranged on the frame at a smaller distance from each other than a distance that the first spherical rotating joint of the first coupling rod and the third spherical rotating joint of the second coupling rod are arranged at a distance from each other on the tilting frame.

16. The supporting device according to claim 14, wherein the first spherical rotating joint, the second spherical rotating joint, the third spherical rotating joint and the fourth spherical rotating joint are designed as joint heads.

17. The supporting device according to claim 13, wherein the spherical pivot bearing is arranged at a distance from an outlet opening of the receiving space which is two to three times greater than the distance of the four-bar linkage from the spherical pivot bearing.

18. The supporting device according to claim 13, wherein the four-bar linkage comprises a spring device designed to hold the tilting frame in a central basic position with respect to the frame when no external forces act on the supporting device.

19. The supporting device according to claim 13, wherein the spherical pivot bearing comprises a ball head which is rotatably guided in a ball socket such that the ball head is mounted so as to be tiltable by a tilt angle of up to 40 degrees.

20. A robot arm, comprising:
several links and joints that adjust the links relative to each other;
a line routing device for guiding an energy supply line along several of the links and comprising a receiving space in which a line portion of the energy supply line is mounted so that the energy supply line can be pulled out in an extension direction; and
a supporting device according to claim 1, which supports the line routing device, in particular a casing of the line routing device, movably on a link of the robot arm for movement in a forcibly guided manner in two different rotational degrees of freedom that are each oriented perpendicular to the extension direction.

* * * * *